US012638958B2

(12) United States Patent
Narayanan et al.

(10) Patent No.: US 12,638,958 B2
(45) Date of Patent: May 26, 2026

(54) USER CONTENT MODIFICATION SUGGESTIONS AT CONSISTENT DISPLAY LOCATIONS

(71) Applicant: Google LLC, Mountain View, CA (US)

(72) Inventors: Ajit Narayanan, Mountain View, CA (US); Venkata Vijay Ventrapragada, Mountain View, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 18/577,965

(22) PCT Filed: Aug. 3, 2021

(86) PCT No.: PCT/US2021/044386
§ 371 (c)(1),
(2) Date: Jan. 9, 2024

(87) PCT Pub. No.: WO2023/014352
PCT Pub. Date: Feb. 9, 2023

(65) Prior Publication Data
US 2024/0310975 A1     Sep. 19, 2024

(51) Int. Cl.
*G06F 3/0482* (2013.01)
*G06F 40/166* (2020.01)
*G06F 40/274* (2020.01)
*G06F 40/284* (2020.01)

(52) U.S. Cl.
CPC .......... *G06F 3/0482* (2013.01); *G06F 40/166* (2020.01); *G06F 40/274* (2020.01); *G06F 40/284* (2020.01)

(58) Field of Classification Search
CPC .... G06F 3/0482; G06F 40/166; G06F 40/274; G06F 40/284; G06F 3/0236; G06F 3/0237; G06F 3/04886
See application file for complete search history.

(56) References Cited

U.S. PATENT DOCUMENTS 8,825,474 B1     9/2014   Zhai et al.
9,122,376 B1 *   9/2015   Brotherston .......... G06F 3/0237
(Continued)

OTHER PUBLICATIONS

Wikipedia "Graphic coloring" Jul. 13, 2021 (Year: 2021).*
(Continued)

*Primary Examiner* — Cao H Nguyen
(74) *Attorney, Agent, or Firm* — IP Spring

(57) ABSTRACT

Implementations relate to user content modification suggestions provided at consistent display locations. In some implementations, a method includes obtaining a content item based at least in part on user input and determining a plurality of suggestion tokens based on the content item, each suggestion token indicating a different modification to the content item. For each of the suggestion tokens, a respective display location is determined in a user interface, each suggestion token being previously associated with the respective display location where the suggestion token is to be displayed. The user interface is displayed by a device including one or more of the suggestion tokens displayed in the respective display locations associated with the suggestion tokens, the one or more suggestion tokens being selectable by a user to modify the content item.

20 Claims, 13 Drawing Sheets

(56) References Cited

U.S. PATENT DOCUMENTS

| | | | |
|---|---|---|---|
| 2014/0310639 A1* | 10/2014 | Zhai | G06F 3/0484 |
| | | | 715/780 |
| 2017/0308290 A1* | 10/2017 | Patel | G06F 3/04817 |
| 2019/0050391 A1* | 2/2019 | Knox | G06F 3/0237 |

OTHER PUBLICATIONS

"Graph coloring", Wikipedia, retrieved from Internet: https://en.wikipedia.org/w/index.php?title=Graph_coloring&oldid=1033433832, Jul. 13, 2021, 19 pages.
EPO, International Search Report for International Patent Application No. PCT/US2021/044386, May 6, 2022, 4 pages.
EPO, Written Submission for International Patent Application No. PCT/US2021/044386 May 6, 2022, 7 pages.
Kim, Huhn et al., "Exploring touch feedback display of virtual keyboards for reduced eye movements", Displays 56, 2019, pp. 38-48.
Lu, Yiqin et al., "BlindType: Eyes-Free Text Entry on Handheld Touchpad by Leveraging Thumb's Muscle Memory", Proceedings of the ACM on Interactive, Mobile, Wearable and Ubiquitous Technologies 1.2, 2017, 24 pages.
Poldrack, Russell A. et al., "The Neural Correlates of Motor Skill Automaticity", Journal of Neuroscience 25.22, 2005, pp. 5356-5364.
Trnka, Keith et al., "User interaction with word prediction: the effects of prediction quality", ACM Transactions on Accessible Computing (TACCESS) 1.3, 2009, 33 pages.
Intuary, Inc., "Verbally Premium app", AppAdvice.com, last updated Oct. 29, 2015, retrieved Jan. 9, 2024, https://appadvice.com/app/verbally-premium/470081134, 2015, 5 pages.

* cited by examiner

1700

Device

Processor
1702

I/O Interface
1706

Memory 1704

Operating
System 1708

Application
Data 1714

Other Applications 1712

Machine-learning
Application 1730

Data 1732

Trained Models
1734

Inference Engine
1736

Display Device
1720

USER CONTENT MODIFICATION SUGGESTIONS AT CONSISTENT DISPLAY LOCATIONS

CROSS-REFERENCE TO RELATED APPLICATIONS

This application is the U.S. National Stage filing under 35 U.S.C. § 371 of International Patent Application No. PCT/US2021/044386, filed on Aug. 3, 2021, which is incorporated herein by reference in its entirety for all purposes.

BACKGROUND

User input in the form of text entry is commonly employed for a multitude of devices used by users. In many input interfaces, word or text prediction is often used to predict and suggest additional content based on input that the user has already provided. For example, after the user has input one or more characters or words in a text field of a device, the device may display suggestions such as words or phrases that are likely completions to the content input by the user. The suggestions may be displayed, for example, on or near a displayed virtual keyboard that the user is using to input text content and can be selected to perform the completion to the user's input content.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to user content modification suggestions provided at consistent display locations. In some implementations, a computer-implemented method includes obtaining a content item based at least in part on user input and determining a plurality of suggestion tokens based on the content item, each suggestion token indicating a different modification to the content item. For each of the suggestion tokens, a respective display location is determined in a user interface, each suggestion token being previously associated with the respective display location where the suggestion token is to be displayed. The user interface is displayed by a device including one or more of the suggestion tokens displayed in the respective display locations associated with the suggestion tokens, the one or more suggestion tokens being selectable by a user to modify the content item.

Various implementations and examples of the method are described. For example, in some implementations, the content item includes one or more words forming a prefix that is part of a text phrase, determining the plurality of suggestion tokens includes determining a plurality of suggestion words to follow the prefix in the text phrase, and the one or more suggestion tokens are one or more suggestion words, and the method further includes receiving a selection of a particular suggestion word of the one or more suggestion words, and, in response to receiving the selection, adding the particular suggestion word to the content item following the prefix. In some examples, the plurality of suggestion words are the most probable words to follow the prefix. In some implementations, the content item includes one or more graphical characters that are associated with or represent the content item, the one or more suggestion tokens are one or more suggestion graphical characters, and the method further includes receiving a selection of a particular suggestion graphical character, and, in response to receiving the selection, replacing at least a portion of the content item with the particular suggestion graphical character or adding the particular suggestion graphical character to the content item. In some implementations, the content item includes context information that includes one or more previous communications sent or received by the device, audio captured by the device, video captured by the device, and/or a geographic location of the device.

In some implementations, each suggestion token is displayed in the previously-associated respective display location regardless of content of the content item. In some implementations, the user input is first user input, the content item is a first content item, and the plurality of suggestion tokens is a first plurality, and the method further includes obtaining a second content item based at least in part on second user input, the second content item replacing the first content item; determining a second plurality of suggestion tokens based on the second content item, each suggestion token of the second plurality indicating a respective modification to the second content item and at least one particular suggestion token of the second plurality being the same as at least one suggestion token of the first plurality; determining, for each of the second plurality of suggestion tokens, a respective display location of the plurality of spatially-arranged display locations in the user interface, the at least one particular suggestion token being associated with a same respective display location when included in the second plurality for the second content item as when included in the first plurality for the first content item; and causing the user interface to be displayed by the device, the user interface including one or more second suggestion tokens of the second plurality displayed in the respective display locations associated with the one or more second suggestion tokens, the one or more second suggestion tokens being selectable by the user to modify the second content item.

In some implementations, the method further includes determining the one or more suggestion tokens displayed in the respective display locations, including removing at least one suggestion token from the plurality of suggestion tokens to ensure that the one or more suggestion tokens are displayed without conflict for the respective display locations.

In some implementations, the method further includes determining whether two or more suggestion tokens of the plurality of suggestion tokens are associated with a same display location of the user interface; in response to determining this, assigning a priority level to each of the two or more suggestion tokens, and selecting a first suggestion token having a higher priority level of the two or more suggestion tokens to be displayed in the same display location of the user interface. In some implementations, assigning the priority level includes determining a probability of selection of each of the two or more suggestion tokens, a second suggestion token of the two or more suggestion tokens having a lowest probability of selection of the two or more suggestion tokens. In some implementations, the method further includes causing a second suggestion token of the two or more suggestion tokens to be displayed in a different display location of the user interface that is different than the respective display location associated with the first suggestion token. In some examples, the different display location is a display location within a threshold distance of the respective display location associated with the second suggestion token. In further examples, the respective display locations are located in a first display area of the user interface, and the different display location is located in a second display area separate from the first display area.

In some implementations, determining, for each of the plurality of suggestion tokens, a respective display location is based on a stored suggestion map that indicates the associated respective display locations for the suggestion tokens without conflict for the respective display locations. In some examples, the stored suggestion map is based on includes a graph that includes nodes that correspond to the plurality of suggestion tokens, wherein each pair of the plurality of suggestion tokens is connected in the graph by an edge if the suggestion tokens of the pair both occur as suggestion tokens for a particular content item, wherein each node in the graph is assigned a class by a vertex coloring technique such that two nodes that share an edge have different classes, and wherein each class corresponds to a different display location of the respective display locations. In some implementations, the method further includes generating the graph prior to receiving the user input; and removing at least one of: one or more nodes or one or more edges of the graph to enable the plurality of suggestion tokens to be displayed in the associated display locations with reduced conflict for the associated display locations. In some examples, generating the graph includes determining the nodes and edges by processing a corpus of text including content items and suggestion tokens associated with the content items.

In some implementations, a system to provide user content modification suggestions includes a memory storing instructions and at least one processor coupled to the memory, the at least one processor configured to access the instructions from the memory to perform operations. The operations include obtaining a content item based at least in part on user input; determining a plurality of suggestion tokens based on the content item, each suggestion token indicating a different modification to the content item; determining, for each of the plurality of suggestion tokens, a respective display location of a plurality of spatially-arranged display locations in a user interface, each suggestion token of the plurality of suggestion tokens being previously associated with the respective display location where the suggestion token is to be displayed in the user interface; and causing the user interface to be displayed by a device, the user interface including one or more suggestion tokens displayed in the respective associated display locations, the one or more suggestion tokens being selectable by a user to modify the content item.

In various implementations of the system, the operation of determining the one or more suggestion tokens displayed in the respective display locations includes removing at least one suggestion token from the plurality of suggestion tokens to ensure that the one or more suggestion tokens are displayed without conflict for the respective display locations. In some implementations, the at least one processor further performs operations comprising determining whether two or more suggestion tokens of the plurality of suggestion tokens are associated with a same display location of the user interface; in response to determining that the two or more suggestion tokens are associated with the same display location, assigning a priority level to each of the two or more suggestion tokens; and selecting a first suggestion token having a higher priority level of the two or more suggestion tokens to be displayed in the same display location of the user interface. In some examples, the operation of assigning the priority level includes determining a probability of selection of each of the two or more suggestion tokens, a second suggestion token of the two or more suggestion tokens having a lowest probability of selection of the two or more suggestion tokens. In some implementations, the operations further comprise causing a second suggestion token of the two or more suggestion tokens to be displayed in a different display location of the user interface that is different than the respective display location associated with the first suggestion token, wherein the different display location is a display location within a threshold distance of the respective display location associated with the second suggestion token; a display location in a second display area separate from a first display area in which the respective display locations are located. In various implementations, operations can include one or more features of the method above.

In some implementations, a non-transitory computer readable medium having stored thereon software instructions that, when executed by a processor, cause the processor to perform operations. The operations include obtaining a content item based at least in part on user input; determining a plurality of suggestion tokens based on the content item, each suggestion token indicating a different modification to the content item; determining, for each of the plurality of suggestion tokens, a respective display location of a plurality of spatially-arranged display locations in a user interface, each suggestion token being previously associated with the respective display location where the suggestion token is to be displayed in the user interface; and causing the user interface to be displayed by a device, the user interface including one or more suggestion tokens displayed in the respective associated display locations, the one or more suggestion tokens being selectable by a user to modify the content item. In various implementations, operations can include one or more features of the method or system above.

DETAILED DESCRIPTION

Figure 1:
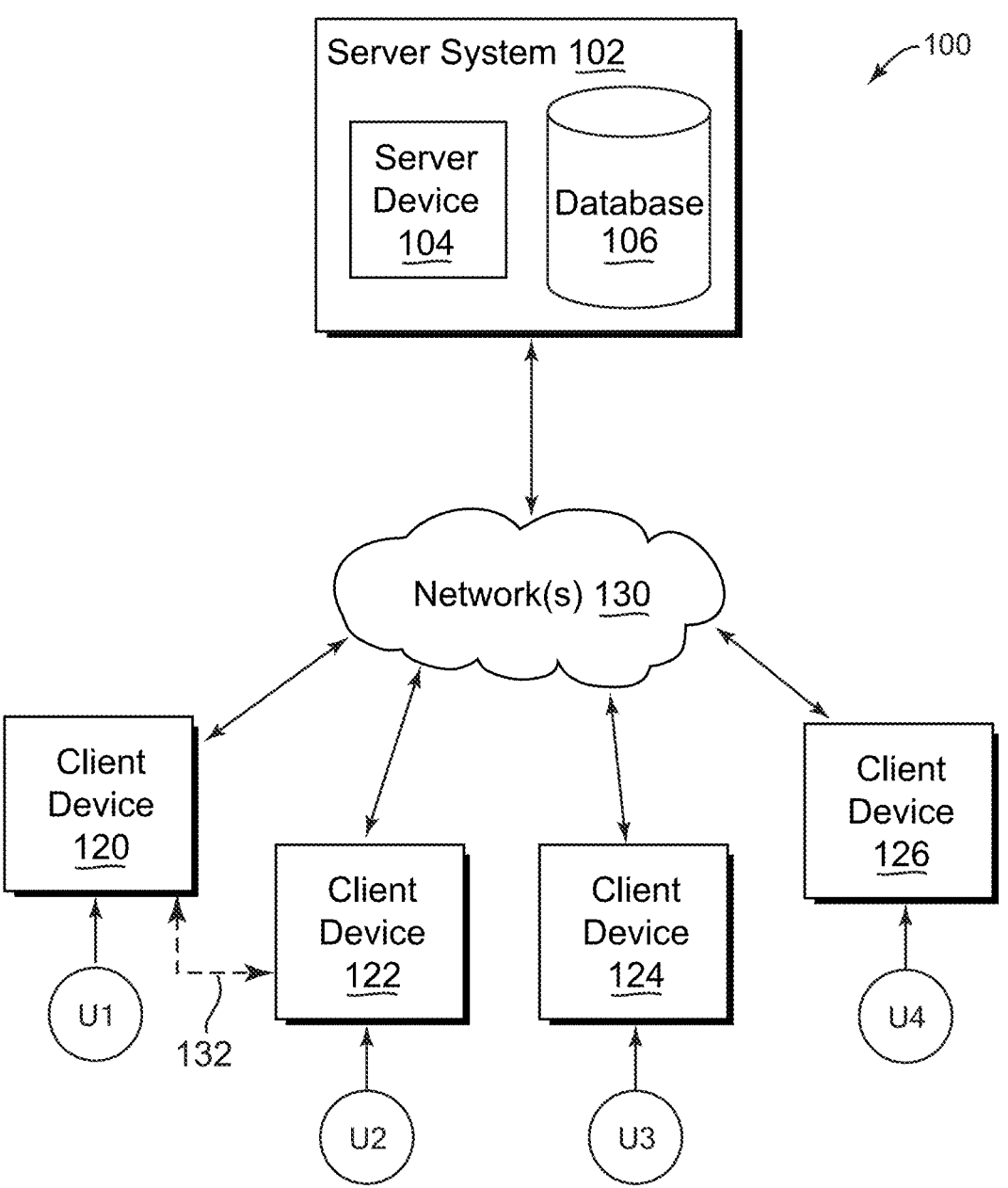
FIG. 1 is a block diagram of an example system which may be used for one or more implementations described herein.

One or more implementations described herein relate to user input content suggestions at consistent display locations. In various implementations, a method can include receiving user input that provides a content item. A plurality of suggestion tokens are determined based on the content item, each suggestion token indicating a different modification to the content item. For example, a suggestion token can be a word that is suggested to be added to the end of a phrase content item, a letter suggested to be added to the end of a word content item, or a symbol suggested to replace a text content item. For each of the suggestion tokens, a respective display location is determined in a user interface. Each suggestion token is previously associated with the respective display location where the suggestion token is to be displayed, such that a suggestion token is consistently displayed at its associated display location regardless of which content item triggers its display. The user interface is displayed by a device and includes one or more of the suggestion tokens displayed in their associated display locations. The displayed suggestion tokens are selectable by a user to modify the content item.

Various additional features are described. For example, at least one suggestion token can be removed to ensure that suggestion tokens are displayed without conflict for the respective display locations. Determining the respective display locations for the suggestion tokens can be based on a stored suggestion map that indicates associated display locations for suggestion tokens without conflict for the respective display locations. In some examples, the stored suggestion map can be based on a suggestion graph that has nodes corresponding to suggestion tokens, and each pair of nodes is connected in the graph by an edge if the nodes of the pair both occur as suggestion tokens for a particular content item. Each node in the graph can be assigned a class by a vertex coloring technique such that two nodes that share an edge have different classes, and each class corresponds to a different display location of the display locations. Nodes and/or edges of the graph can be removed to enable suggestion tokens for a content item to be displayed without (or with reduced) collisions for a common display location.

In some implementations, it is determined whether two or more suggestion tokens collide, e.g., are associated with a common display location of the user interface. If so, a priority level can be assigned to each of the colliding suggestion tokens, and a suggestion token having a highest priority level is selected to be displayed in the common display location. A probability of selection of each of the colliding suggestion tokens can be used to determine priority levels of the suggestion tokens. In some implementations, a lower priority colliding suggestion token can be displayed in a different display location of the user interface, e.g., in a vacant location that is within a threshold distance of the common display location, or in a different display location located in an alternate display area of the user interface.

There are several advantages to described techniques and features. Described implementations display suggestion tokens for a content item that provide modifications to the content item, and the suggestion tokens are consistently displayed in the same location in a suggestion display area of the user interface. This is unlike previous word prediction interfaces, which display predictions in a separate area of the user interface at varying display locations that are unpredictable by the user. Using such a previous interface, the user has to divert both their attention and their eye gaze away from a keyboard and onto a prediction area to scan it, check if the word they're intending to type is present, and then select it. This imposes a cognitive burden on the user, causing the user to reduce the number of keyboard interactions they are able to perform. Showing the user a large number of predictions increases the probability that they will find the word they are looking for, but also increases the amount of time they spend in looking for the word among the predictions. Particularly, it increases the cost of misprediction, since if the user cannot find the desired word, the time they spent looking for it is essentially wasted.

In contrast, various implementations described herein display suggestion tokens in a grid or other spatial arrangement so that particular suggestion tokens are associated with particular locations. Thus, when a particular suggestion token is displayed for any content item, it is consistently displayed in the same display location. This allows a user to become accustomed to the display locations with use, and develop motor automaticity-they are able to recall the locations of suggestion tokens from muscle memory without needing to actively scan the grid visually each time. Muscle memory and motor automaticity have been shown to dramatically reduce the cognitive load associated with text entry. If a user wants to visually check if a desired word is predicted or not, they only need to look at one location in the grid, regardless of the number of predictions that the grid shows; no visual scanning is needed. Therefore, using described implementations, cognitive burden is kept constant and low and does not scale with the number of predictions.

Thus, described techniques allow a system to show many suggestions (e.g., several dozens or hundreds, if needed) while minimizing the cognitive burden imposed by them. Described techniques allow the number of suggestions shown on the screen to be scaled higher without scaling the user's cognitive cost of selecting a suggestion. This increases text entry speed to devices, which is an important advancement of the state-of-the-art. Furthermore, some implementations of described techniques provide a suggestion map that provides reduced or minimal collisions of suggestion tokens that are assigned to be displayed in the same display locations, such that all or most of the provided suggestion tokens in the map can be displayed in a user interface as selection options for a user.

Consequently, a technical effect of one or more described implementations is that devices expend fewer computational resources to obtain results. For example, a technical effect of described techniques is a reduction in the consumption of system processing resources and power resources as compared to prior systems that do not provide one or more of the described techniques or features. For example, such a prior system may require longer periods of time to input content or other data, which expends system resources (e.g., power consumption and display processing). Features described herein can reduce such disadvantages by, e.g., enabling faster text entry by users and lower overall processing requirements. In addition, features described herein can allow a greater number of predictions or suggestions for user input to be displayed at one time on a display device without causing delays in data entry or increased burden on the user.

This reduces the expenditure of system resources that may occur compared to a case where fewer predictions are displayed and a user has to provide additional input before further desired options are presented, causing additional processing by the system to present additional and/or different predictions and extending the time of display and data entry. In addition, the use of a graph and/or other data structures according to described techniques allows reduced or minimal collisions when determining display locations for suggestions, and reduces system processing to handle such collisions during presentation of suggestions in response to obtained or received content items. For example, in some implementations, data structures such as graphs that can be accessed to provide consistent display locations for suggestions can be created prior to times at which the user is inputting content, thus reducing the consumption of processing resources during content entry.

Further to the descriptions herein, a user may be provided with controls allowing the user to make an election as to both if and when systems, programs, or features described herein may enable collection of user information (e.g., information about a user's prior inputs via a keyboard; a user's conversations via a messaging app, via email, or other applications, including audio and/or video; a context of use of a user device; social network, social actions, or activities, profession, a user's preferences, a user's current location, or a user's device), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, which may be used in some implementations described herein. In some implementations, network environment 100 includes one or more server devices, e.g., server system 102 in the example of FIG. 1. Server system 102 can communicate over a network 130, for example. Server system 102 can include a server device 104 and a database 106 or other storage device. Network environment 100 also includes one or more client devices, e.g., client devices 120, 122, 124, and 126, which may communicate with server 102, with each other, and/or with other devices via network connections 130. Network 130 can be any type of communication network, including one or more of the Internet, local area networks (LAN), wireless networks, switch or hub connections, etc. In some implementations, network 130 can include peer-to-peer communication between devices 120-126, e.g., using peer-to-peer wireless protocols (e.g., Bluetooth®, Wi-Fi Direct, etc.) or having one client device act as a server to the other client device, etc. One example of peer-to-peer communications between two client devices 120 and 122 is shown by arrow 132.

For case of illustration, FIG. 1 shows one block for server system 102, server device 104, and database 106, and four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems, e.g., via the network 130. In some implementations, server system 102 can include cloud hosting servers, for example. In some examples, database 106 and/or other storage devices can be provided in server system block(s) that are separate from server device 104 and can communicate with server device 104 and other server systems via network 130. Also, there may be any number of client devices. In some examples, server system 102 wirelessly communicates with client devices over network connections 130, the client devices providing various features that can be enabled or supplemented by signals from the server mobile device.

Server system 102 and client devices 120-126 can be any types of devices used in a variety of applications, e.g., desktop computer, laptop computer, portable or mobile device, cell phone, smart phone, tablet computer, television, TV set top box or entertainment device, wearable devices (e.g., display glasses or goggles, head-mounted display (HMD), earpiece, earbuds, fitness band, wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, client devices 120-126 may interact with server system 102 via applications running on respective client devices and/or server system 102. For example, respective client devices 120, 122, 124, and 126 may communicate data to and from server system 102. In some implementations, server system 102 may send various data to all or particular devices of the client devices, such as content data (e.g., audio, images, video, messages, emails, etc.), notifications, commands, etc. Each client device can send appropriate data to the server system 102, e.g., acknowledgments, requests for data, notifications, user commands, etc. In some examples, the server and client devices can communicate various forms of data, including text data, audio data, video data, image data, or other types of data.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Various applications and/or operating systems executing on the server and client devices can enable a variety of functions including display of content data, privacy settings, notifications, browsers, email applications, communication applications, etc. A user interface can be displayed on a client device using an application or other software executing on the client device, software on the server device, and/or a combination of client software and server software executing on server 102, e.g., application software or client software in communication with server 102. The user interface can be displayed by a display device of a client device or server device, e.g., display screen(s), projector, etc. In some implementations, application programs running on a server can communicate with a client device to receive user input at the client device and to output data such as visual data, audio data, etc. at the client device. In some implementations, one or more devices of network environment 100, e.g., one or more servers of the server system 102, may maintain an electronic encyclopedia, a knowledge graph, one or more databases, a corpus of words, phrases, symbols, and other information, a social network application (e.g., a social graph, a social network for friends, a social network for business, etc.), a website for a place or location (e.g., a restaurant, a car dealership, etc.), a mapping application (e.g., a website that looks up map locations), etc. In some implementations, server system 102 may include classifiers of particular types of content items (e.g., text or images), and can determine whether any of particular classes are detected in obtained content items.

Some implementations can provide one or more features described herein on client or server devices disconnected from or intermittently connected to computer networks. In some examples, a client device including or connected to a display device can process content items and determine suggestion tokens on processing and storage devices local to the client device (e.g., not connected via a communication network) and can provide features and results as described herein that are viewable to a user.

Machine learning models can be used by server system 102 and/or one or more client devices 120-126 as described herein. In some implementations, the machine learning models may be neural networks with one or more nodes, arranged according to a network architecture, e.g., in one or more layers, with various nodes connected via the network architecture, and with associated weights. For example, in a training stage of the model, a model can be trained using training data, and then at an inference stage, the trained model can determine output based on input data. In some implementations, a model may be trained offline, e.g., on a test device in a test lab or other setting, and the trained models may be provided to the server that executes the models. In some implementations, the trained model may be retrained or updated locally on-device, or an untrained model may be trained on-device. In some implementations, with user permission, federated learning may be utilized to update one or more trained models, e.g., where individual server devices may each perform local model training, and the updates to the models may be aggregated to update one or more central versions of the model.

Figure 2:
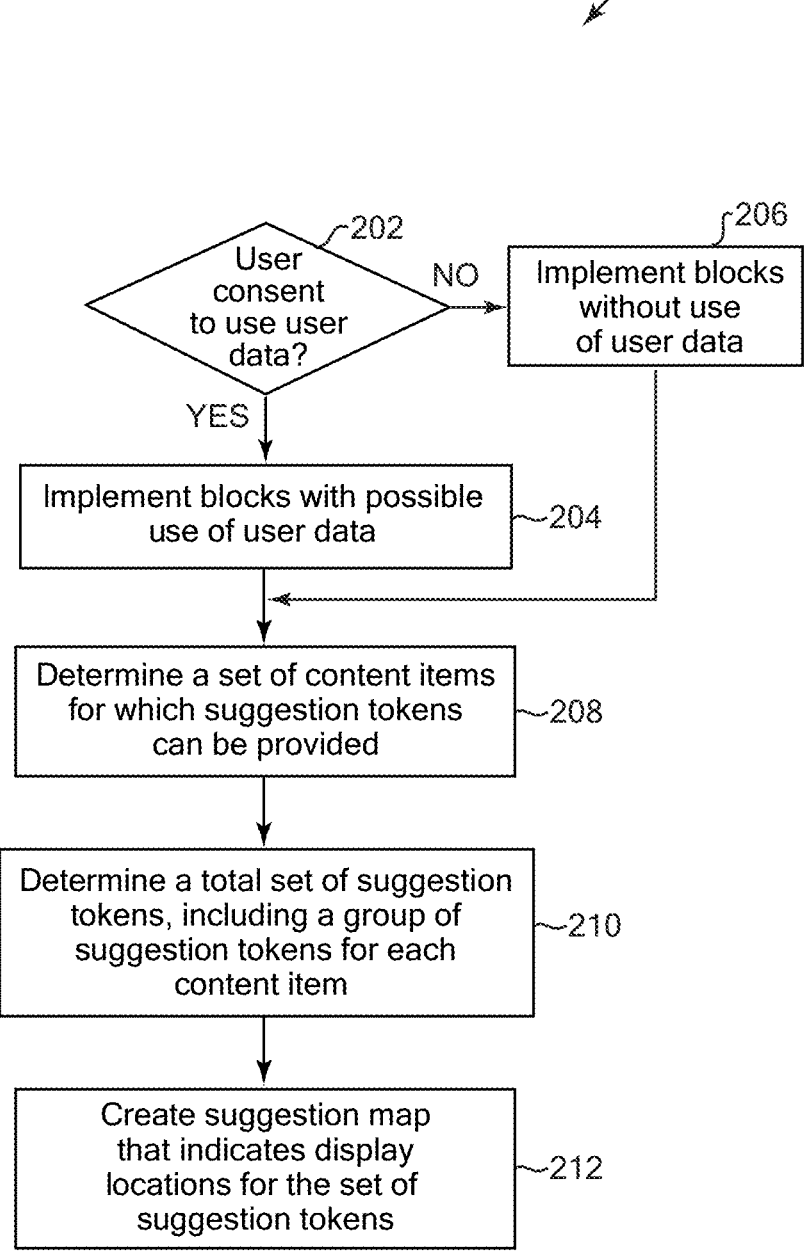
FIG. 2 is a flow diagram illustrating an example method to generate a suggestion map that indicates consistent display locations for content modification suggestions, according to some implementations.

FIG. 2 is a flow diagram illustrating an example method 200 to generate a suggestion map that indicates consistent display locations for content modification suggestions, according to some implementations. In some implementations, method 200 can be implemented on a server, e.g., server system 102 as shown in FIG. 1. In some implementations, some or all of the blocks of method 200 can be implemented on one or more client devices (e.g., client devices 120, 122, 124, or 126 as shown in FIG. 1), one or more server devices, and/or on both server device(s) and client device(s). In described examples, the system(s) implementing the blocks of method 200 include one or more processor hardware or processing circuitry ("processors"), and can access one or more storage devices such as database 106 or other accessible storage. In some implementations, different components of one or more server systems can perform different blocks or portions of blocks.

Method 200 can be performed as a preprocessing method that determines and stores a suggestion map that indicates display locations for content modification suggestions. The created suggestion map can be accessed to determine display locations for suggestion tokens that are generated in response to particular content items received by the device, e.g., input by a user, as described below with reference to FIG. 4.

Some implementations can initiate method 200 based on user input. A user may, for example, have selected the initiation of the method 200 from a displayed user interface. In some implementations, method 200 or portions thereof can be performed with guidance by the user via user input. In some implementations, the method 200, or portions of the method, can be initiated automatically by a device. For example, the method (or portions thereof) can be periodically initiated, or initiated based on the occurrence of one or more particular events or conditions. For example, such events or conditions can include obtaining one or more content items that have been received from another device or newly created or otherwise accessible by a user device, a predetermined time period having expired since the last performance of method 200, and/or one or more other events or conditions occurring which can be specified in settings of a device implementing method 200. In some examples, a device (server or client) can perform the method 200 with access to a collection of accessible content items and suggestion tokens (if user consent is received).

In block 202, it is checked whether user consent (e.g., user permission) has been obtained to use user data in the implementation of method 200. For example, user data can include user preferences, user biometric information, selections of suggestion tokens, suggested responses, or other content in user interfaces of a device, or other content data items in a content collection (e.g., images/audio/video captured, received, accessed, or otherwise associated with a user), messages sent or received by a user, information about a user's social network and/or contacts, user characteristics, a user's geographical location, historical user data, etc. One or more blocks of the methods described herein may use user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the remainder of method 200 is not performed, and/or particular blocks using the user data are not performed. In some implementations, if user consent has not been obtained, blocks of method 200 are to be implemented without use of user data and with generic or publicly-accessible and publicly-usable data.

In block 208, a set of content items is determined for which suggestion tokens can be provided. These are items of content data for which one or more suggestion tokens are to be provided on a device in response to one of these content items being received by the device, e.g., via input to the device by a user.

The set of content items are possible and/or likely content that can be obtained, e.g., via user input to a user interface of a device. The suggestion tokens indicate possible or likely intended modifications to the content items. For example, a content item can include one or more words, phrases, symbols, or other content. In some implementations, the set of content items can be determined from a corpus of content data, e.g., a corpus of text and/or other content data. In some examples, if user consent has been obtained, the set of content items can be a set of words, symbols, and/or phrases that have been sampled from or created based on user input to devices (e.g., client devices 120-126, etc.) from various users or from messages from users, and/or from other sources (documents, images, etc.). For example, this common user input can be provided in search fields, messages, input fields, and other input modes of various applications of devices, and has been disassociated from users who originally input the content. In some examples, the content items in the set can be the most frequently occurring content items that have been input by users and/or output by devices, e.g., in messages or other content forms. In some examples, a content item can be a "prefix" of one or more text words or phrases (or other content) input by the user, which is a portion of a complete phrase or sentence. In some examples, a content item can be a text form of one or more symbols, emojis, or characters, that can be replaced by an equivalent symbol, graphical character, image, video, etc.

In some implementations, if user consent has been obtained, one or more content items in the set of content items can include content data that is context information related to a context of a user, or a context of, or a context provided by, a device (such as a user device or client device). Suggestion items can be predicted and determined based on such context information. In various examples, if user consent is obtained, context information can include text and images sent or received by a user device in previous or current communications, images, audio and/or video data captured by the device (e.g., in previous or current user chats or conversations), a geographic location of the device, weather at the location, a time related to the device (e.g., time of day, day of week, etc.), one or more applications running on the device, displayed contents of the display screen of the device, etc. In some implementations, a content item includes content data that is a base portion (e.g., text or image, etc.), such as a prefix as described above, and includes content data that is context information associated with that base portion. For example, a content item can include a text message sent by a user as a base portion and can include context information related to the user and/or device that were sent with or stored in association with the text message, such as attached images, video, and/or audio data sent in the message, video or audio data captured at the time of the message, device location at the time of the message, the time the message was sent, apps running on the device and/or contents of the display screen of the device at the time of the message, etc. Context information that is not normally stored (e.g., attached with a message) can, if user consent has been obtained, be captured and stored in association with base portions of content items such as messages sent and received by the user. Such context information can be retrieved in block 208 as content items or portions of content items included in the set of content items. Block 208 may be followed by block 210.

In block 210, a total set of suggestion tokens for the set of content items is determined, including an associated set of one or more suggestion tokens for each content item of the set of content items. In some implementations, each suggestion token in a set can indicate a different possible or likely intended modification to the associated content item. For example, each suggestion token can include one or more words, phrases, symbols, and/or other predicted forms that indicate a completion or modification to one or more associated content items of the set of content items. In some implementations, the set of suggestion tokens can be determined based on a corpus of content data (e.g., corpus of text and/or other content data) from which the set of content items is determined in block 208. For example, the corpus of data can be a large set of documents and other content data including content items and completions to those content items.

In some examples, a content item can be a prefix of one or more text words or phrases input by the user, and each suggestion token in the set of suggestion tokens for that prefix can be a predicted completion of that prefix. For example, a content item can be a phrase "Let's go to the", and the set of suggestion tokens for this content item can be "store," "park," "beach," "car," "party," etc., which are predicted to be likely completions to the content item phrase based on common phrases in the corpus of text. In other examples, the prefix can be a portion of a word and the set of suggestion tokens are possible and/or likely completed words corresponding to that word portion, based on the particular characters of the word portion. For example, if the prefix is "ca", possible suggestion tokens can include "cat," "calculator," "calendar," "car," etc. Various implementations can use prefixes of different lengths, e.g., short, long, etc. In some examples, a suggestion token can indicate a replacement for a content item. For example, if a content item is a word that is a text spelling of a Chinese character using Roman letters, a suggestion token for that content item can be a graphical character or symbol, e.g., a Chinese character, that is equivalent to and can be used as a replacement for that word.

In some examples, suggestion tokens determined for content items that are or include images, emojis, or symbols can be predicted next images, emojis, or symbols in a sequence of such data that includes the content item. In further examples, suggestion tokens determined based on a geographic location can be, if user consent has been obtained, identifications, names, or labels, text descriptions, or images of people, entities, monuments, or objects located at that geographic location (e.g., persons associated with the user at that location). Suggestion tokens can be determined based on context information and can be, for example, text, images, memes, or other content data that includes, is associated with, or is related to the context information, e.g., obtained from a user image collection, etc.

Suggestion tokens can be determined for content items using any of a variety of techniques. Some example techniques include use of machine learning models, graph-based models, other types of models, heuristics and rules (used instead of or in addition to machine learning models), etc. For example, an N-gram model can be used to predict the occurrence of a word (or other token such as a character) based on the occurrence of the N-1 previous words (or characters) of the N-gram. The model can be based on N-grams sampled or collected from a text or speech corpus. In some examples, probabilities are assigned to the occurrence of an N-gram or the probability of a word occurring next in a sequence of words. In some examples, a database of triplets (tri-grams) can be created, which predicts the occurrence of a third word based on the two previous words of the tri-gram. Other various known techniques can alternatively or additionally be used to determine one or more suggestion tokens based on content items such as portions of words, phrases, or symbols, context information, or other types of content. For example, other techniques that can be used include ngrams with backoff, neural network based language models, word embeddings such as word2vec, ngrams that include part-of-speech information, etc. Non-text prediction techniques can include transliteration techniques to determine symbols equivalent to text, and emoji prediction techniques, e.g., predicting an emoji based on a user-created drawing or a next emoji based on previously-typed emojis. If user consent has been obtained, suggestion tokens can be determined based on content items that are or include context information (as described above) such as images, audio or video data, device location, etc. For example, suggestion tokens can be determined using recognition models and techniques to classify or identify objects or words in audio or image data, based on geographic information (e.g., place, monument, or region names) near or related to the device location, names related to apps or images displayed on the user device, calendar items of the user related to the time of a message, etc.

In some implementations, a number of pairs of content-suggestion can be determined, where each pair indicates a content item and an associated suggestion token that can be suggested for that content item. A content item may be in multiple pairs, where each of the multiple pairs can have a single content item and a single suggestion token associated with that content item. A particular suggestion token can also appear in multiple pairs, e.g., as a suggestion for a first content item and as a suggestion for a second content item. In some implementations, such pairs can be used in determining a suggestion graph as described for FIG. 3. For example, two suggestion tokens occurring in different pairs for the same content item can be joined by an edge in the graph. In some implementations, such pairs can be used when determining displayed suggestions. For example, for a particular content item, all the pairs that feature that item can be filtered and grouped based on frequency of occurrence of the suggestion, and the top suggestions (e.g., having highest frequency) can be displayed in the user interface when determining suggestion tokens for a particular content item that has been obtained (e.g., described for FIG. 4).

Some implementations use a finite total set of suggestion tokens from which suggestion tokens can be provided for content items, e.g., a maximum size of a vocabulary of suggestion tokens that can be provided. In such implementations, a set of suggestion tokens provided for any given content item is a subset of the total set. Block 210 may be followed by block 212.

In block 212, a suggestion map is created that indicates display locations in the user interface for the total set of suggestion tokens determined in block 210. The suggestion map can be any data structure such as a graph, table, list, or other structure that indicates respective display locations for suggestion tokens. According to features described herein, the display location associated with a particular suggestion token is a constant display location in the user interface in which the suggestion token is to be displayed regardless of which content item triggers its display. The suggestion map is created with a constraint such that for any particular content item, all the suggestion tokens that the content item generates should be assigned different display locations so that all these suggestion tokens are displayable simultaneously in the display area for suggestion tokens.

In some implementations, the suggestion map can store a display location for each suggestion token of the total set of suggestion tokens (or for each suggestion token of a subset of the set of suggestion tokens, e.g., the most frequent suggestion tokens that are displayed in response to content items). In some implementations, a display location identifier is assigned to each suggestion token of the total set of suggestion tokens and the suggestion map stores these identifiers. In some implementations, the display location identifier can identify a display location in a user interface, e.g., with reference to a set of designated display locations that are available to display suggestion tokens in a designated display area of the graphical user interface. For example, each designated display location in the user interface can be associated with a different number identifier or other form of identifier. A group of suggestion tokens that are associated with a particular content item are each assigned a different display location than the other tokens in the group so that these suggestion tokens can be displayed simultaneously in the user interface as suggestions to modify that content item. Several suggestion tokens are typically assigned to each display location in the suggestion map, since the number of display locations in the user interface is typically far lower than the number of possible suggestion tokens that can be displayed.

In some implementations, the suggestion map can be created in block 212 so as to reduce or minimize the number of collisions of display locations between suggestion tokens. For example, in some implementations the suggestion map can be, or can be based on, a suggestion graph that indicates the designated display locations for each suggestion token of the total set of suggestion tokens (or each suggestion token of a subset of the total set of suggestion tokens, e.g., a subset of the most frequent suggestion tokens that are displayed in response to content items). The graph can be arranged or adjusted to assign display locations to suggestion tokens such that collisions between suggestion tokens are reduced and/or minimized. Thus, suggestion tokens that are mapped to display locations based on the graph are not likely to collide with other selected suggestion tokens. In addition, in some implementations, the suggestion map can be arranged to provide proximal positioning of vacant display locations in the user interface to designated display locations associated with colliding suggestion tokens. Some examples of creating a suggestion graph for a suggestion map are described below with respect to FIG. 3.

In some implementations, additional information related to the suggestion tokens can be stored in the suggestion map or stored in a data structure associated with the suggestion map (e.g., the suggestion graph, a separate table or list, etc.). For example, the additional information can include a probability of the suggestion token to be selected when presented for a particular content item, as determined based on user selection data (if user consent has been obtained) or other data using in block 210. The additional information can include a frequency of occurrence of each suggestion token, e.g., how frequently the suggestion token is presented for all content items. In some implementations, such additional information can alternatively or additionally be determined or obtained when determining suggestion tokens for a particular content item that has been obtained, as described with reference to FIG. 4. In some implementations, the additional information can be used to determine which suggestion token to display at a display location if there is a collision between two or more suggestion tokens, e.g., if there are multiple suggestion tokens for a particular content item that are associated with the same display location in the user interface. In some implementations, one of these colliding selection tokens is selected to be displayed, examples of which are described below with reference to FIGS. 4 and 5. In some implementations, a suggestion graph that is used to calculate the suggestion map can store such additional information as described above, which can be used for recalculation of display locations of suggestion tokens based on user's usage data (if user consent has been obtained), and/or for determining designated display locations in the user interface for new suggestion tokens that are not present in the set of suggestion tokens (e.g., proper nouns that have been input by the user).

Figure 3:
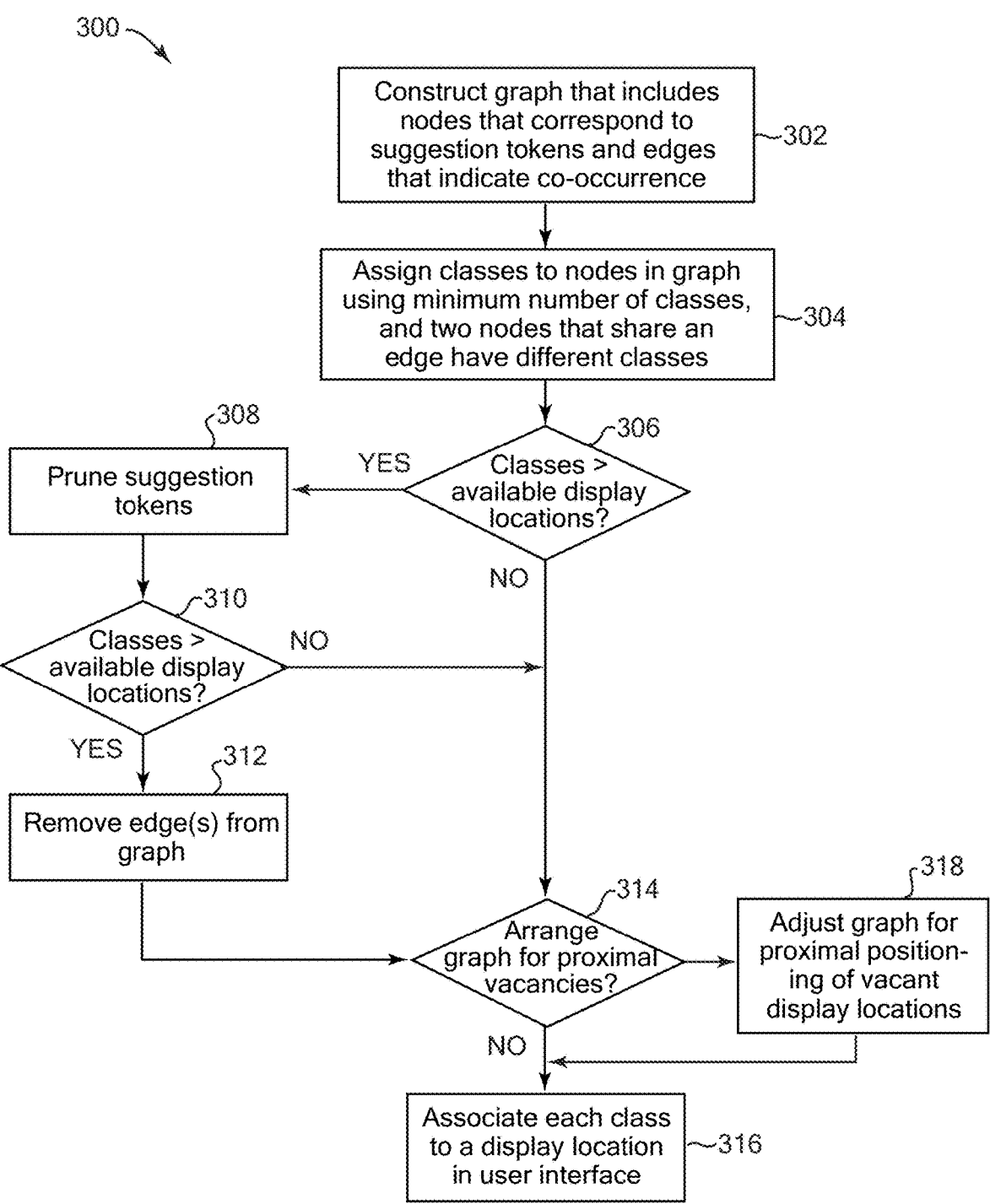
FIG. 3 is a flow diagram illustrating an example method to create a suggestion graph that enables display locations for suggestion tokens to be designated and enables reduced collisions of suggestion tokens at a common display location, according to some implementations, according to some implementations.

FIG. 3 is a flow diagram illustrating an example method 300 to create a suggestion graph that enables display locations for suggestion tokens to be designated and enables reduced collisions at a common display location, according to some implementations. For example, method 300 can be implemented as block 212 or a portion of block 212 of FIG. 2.

Method 300 may begin at block 302. At block 302, a graph is constructed that includes nodes that correspond to suggestion tokens and edges between suggestion tokens that indicate co-occurrence of the pair of connected suggestion tokens for any particular content item in the set of content items. For example, the suggestion tokens that populate the graph can be the total set of suggestion tokens determined in method 200 of FIG. 2, or a subset thereof. Each edge that connects two suggestion tokens in the graph indicates that those two suggestion tokens both occur as suggestions for a particular content item.

In an illustrative example, the set of content items from block 208 of FIG. 2 includes prefixes P1 to P4 that each include one or more words, and the total set of suggestion tokens from block 210 of FIG. 2 includes words W1, W2, etc. which are suggestion tokens (e.g., predictions) for prefixes P1 to P4. In this example, the distribution of words as predictions for the prefixes is as follows:

P1 has suggestions W1, W2, W3
P2 has suggestions W1, W4, W5
P3 has suggestions W2, W6, W7
P4 has suggestions W4, W5

Figure 6:
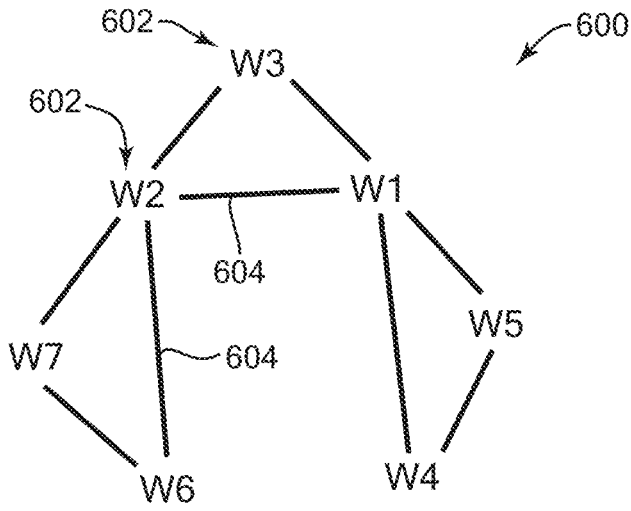
FIGS. 6-12 are diagrammatic illustrations of example graphs that include suggestion tokens as nodes and/or indicate display locations for the suggestion tokens.

The graph is constructed such that each word W1, W2, etc. is a node and two words in the graph are joined by an edge if they co-occur as predictions for any prefix P1 to P4. Thus, W1 and W2 co-occur as predictions for P1 and are connected by an edge, but W1 and W6 do not co-occur as predictions for any of the prefixes and are not connected by an edge. An example of a graph constructed for this example is shown in FIG. 6 as graph 600 that includes nodes 602 (words W1, W2, W3, etc.) and edges 604 that connect various words that co-occur as suggestions for particular content items. Block 302 may be followed by block 304.

In block 304, classes are assigned to nodes in the graph using a minimum number of classes, where two nodes that share an edge are assigned different classes. Nodes that do not share an edge can have the same class or different classes. Each class corresponds to a different display location in the user interface for displaying suggestion tokens. A class need not correspond to a specific display location in the user interface; e.g., the class can correspond to any display location in a designated display area used to display suggestion tokens. Nodes can be assigned to the same class as long as those nodes do not share an edge, because edge-sharing nodes are to be simultaneously displayed as multiple suggestions for a user to modify a content item and so require different classes. Classes can be indicated in various ways in different implementations; e.g., various types of identifiers can be assigned to nodes to indicate different categories or classifications for nodes, such as subscripts or superscripts, numbers, colors, labels, etc.

In some implementations, assigning classes to the nodes in the graph can be performed using a vertex coloring (or graph coloring) technique that assigns a class (e.g., designated by a color or other indicator) to every vertex of the graph such that two vertices that share an edge are assigned different classes.

By Brooks' theorem, the maximum number of classes that are needed to classify a graph is equal to one plus the maximum degree of the graph, where the maximum degree is the maximum number of edges that a node has over all nodes in the graph. If the graph is not fully connected (complete graph) or is a cycle graph with an odd number of vertices, the number of classes needed is the maximum degree, which can be assumed here since it is unlikely that the graph created based on the suggestion tokens as described above is either of those two types.

Figure 7:
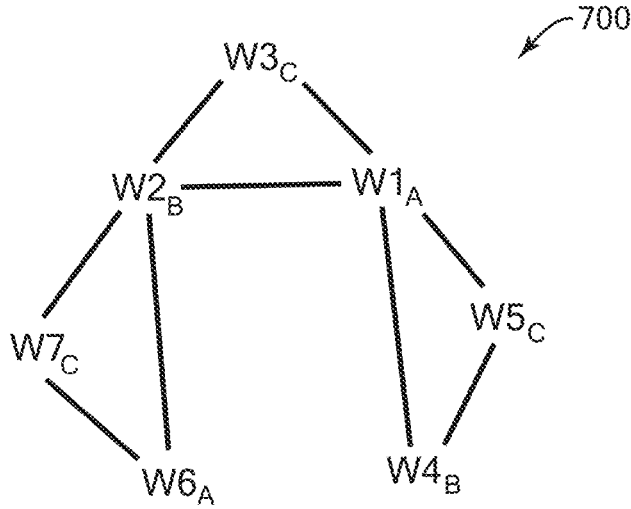

For example, in the graph 600 of FIG. 6, the maximum degree is 4 since W1 and W2 each have four edges and are each connected to four other nodes. Thus, by a graph coloring technique, the graph 600 can classify nodes with four classes or less. FIG. 7 shows an example of a graph 700 that is graph 600 classified with three classes, where classes assigned to word nodes are indicated in FIG. 7 by subscript letters (e.g., A is a first class, B is a second class, etc., and $W1_A$ indicates W1 is assigned the first class, $W2_B$ indicates W2 is assigned the second class, etc.). Block 304 may be followed by block 306.

In block 306, it is checked whether the number of classes in the graph is greater than the maximum number N of display locations that are available in the designated display area of the user interface that is used to display suggestion tokens. If the number of classes needed to classify the vertices of the graph is greater than the number of display locations in the user interface, then there may be too few display locations to display all of the suggestion tokens associated with one or more content items, and a consistent display location for all the suggestion tokens may not be achievable for all content items in the set of content items. For example, the user interface may be able to display a maximum of 10 suggestion tokens in 10 display locations, and the number of classes in the graph may be greater than 10, in which case there can be content items that are associated with a number of suggestion tokens that will not all fit in the available display locations of the user interface. This can cause one or more collisions or conflicts of the suggestion tokens, e.g., two or more suggestion tokens that would need to be displayed in a single display location to display all of the suggestion tokens in a group.

If the number of classes is less than or equal to the maximum number of available display locations, then the method continues to block 314, described below. If the number of classes is greater than the number of available display locations, then the method continues to block 308, in which one or more suggestion tokens are pruned or removed to cause the number of classes needed by the graph to be reduced, e.g., to reduce the chromaticity of the graph. Since the user interface is not able to display more than N suggestions for any content item, the maximum number of suggestion tokens associated with a content item can be reduced so that there are at most N suggestion tokens for each content item in the set of content items, where N is the number of designated display locations in the user interface. In some cases, this can cause at most N slots to be needed in the graph. Thus, display of all associated suggestion tokens for all content items can be reduced to provide a configuration of the graph that displays suggestion tokens in consistent display locations.

In some implementations, suggestion tokens are pruned by removing one or more suggestion tokens from groups of suggestion tokens associated with content items such that the groups have at most N suggestion tokens. In some implementations, the lowest-probability suggestion token(s) can be considered to have the lowest priority and can be removed from groups having more than N suggestion tokens so that the groups have a maximum of N suggestion tokens. The lowest probability suggestion tokens are suggestion tokens having the lowest probability of being selected by a user to modify the associated content item. For example, such probabilities can be obtained from techniques that provide suggestion tokens for content items as described above with reference to FIG. 2.

In some implementations, suggestion tokens can additionally or alternatively be pruned from the total set of suggestion tokens used to provide groups of suggestion tokens for content items. For example, the lowest-frequency suggestion tokens can be removed from the total set of suggestion tokens. These can be suggestion tokens that do not occur as frequently in general use, such as words that are determined (with user consent) to occur or be used less frequently in messages, commands, or other uses on user devices. For example, since a typical user has an upper limit on how many consistent display locations they will learn and remember for suggestion tokens, the overall size of a (large) set of suggestion tokens can be reduced without much detrimental effect on choices of suggestion tokens for a user. These two heuristics of reducing suggestion tokens can result in reduction of the maximum degree of the graph and thus reduction of the number of classes that are needed in the graph.

Figure 8:
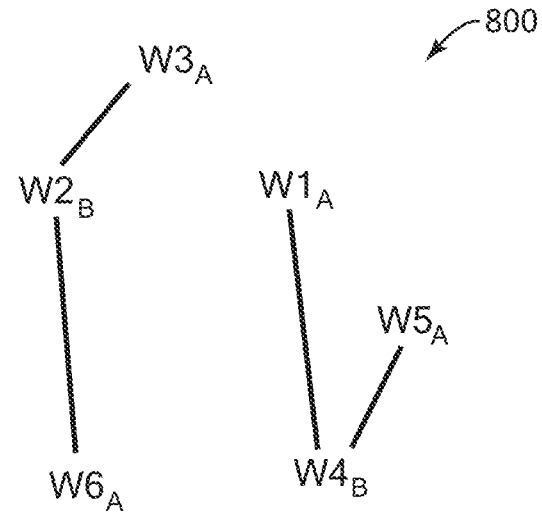

FIG. 8 shows an example of a graph 800 formed from the same set of content items as graph 600, after a pruning of suggestion tokens has been performed as described above. It is assumed in this example that there are only two display locations in the user interface and thus only two suggestion tokens can be displayed simultaneously. Graph 600 has a greater number of classes (three) than the number of available display locations (two). Accordingly, the number of suggestion tokens is pruned by, for example, removing the lowest-probability suggestion token(s) from each group of suggestion tokens that has more than two suggestions for an associated content item.

For the sake of this example, it is assumed that the pruning results in the following predictions for prefixes P1 to P4:

P1 has predictions W2, W3
P2 has predictions W1, W4
P3 has predictions W2, W6
P4 has predictions W4, W5 where prediction W1 is removed from the group of suggestion tokens W1, W2, and W3 for prefix P1 as having the lowest probability of being selected to modify prefix P1. Similarly, W5 is removed from the group for prefix P2, W7 is removed from the group for prefix P3, and W1 is removed from the group for prefix P4 as the lowest-probability words in their groups.

Graph 800 of FIG. 8 thus has fewer nodes and edges than graph 600 of FIG. 6, and in this case graph 800 can classify nodes with just two classes as shown by the subscripts in FIG. 8, allowing all of the suggestion tokens for any content item to be displayed in the available display locations. The method continues to block 310.

In block 310, it is again checked whether the number of classes in the graph is greater than the maximum number N of designated display locations that are available in the user interface. For example, the pruning of suggestion tokens in block 308 may have resulted in the graph still having more classes than the number N of display locations. If the number of classes is less than or equal to the number N of display locations, then the method continues to block 314, described below.

If the number of classes is greater than the number N of display locations as determined in block 310, then the method continues to block 312, in which one or more edges of the graph are removed. Removed edges represent valid suggestions for a content item that are not displayed by the user interface. In some implementations, the first edges to be removed can be edges that are connected to nodes that have the highest degree in the graph, e.g., nodes having the greatest number of edges in the graph. The edge having the lowest probability of the edges of that highest degree node can be removed. The probability of an edge is not the conditional probability of the associated suggestion token given a content item, since multiple edges connected to a node may be associated with different content items. Rather, the probability of an edge is the cumulative probability of all the phrases obtained by concatenating the content item and suggestion token (or otherwise modifying the content item using the suggestion tokens).

For example, the cost of deleting an edge can be generalized by the following:

$$\text{sum}_j(\min_i P(S_i | C_j))$$

where $C_j$ are the content items (e.g., prefixes) contributing to this edge, e.g., prefixes for which both words co-locate, $S_i$ are the two terminal nodes of the edge (e.g., suggestion tokens such as words), and i and j are indices that indicate that the minimum is taken over the two nodes that are connected by the edge and the sum is taken over all content items for which the two nodes are co-located suggestion tokens. The expression thus indicates that the cost of deleting an edge is the sum of probabilities (P) of the lowest probability suggestion token concatenated with each of the content items contributing to this edge. The edge that has the minimum cost is removed.

Figure 9:
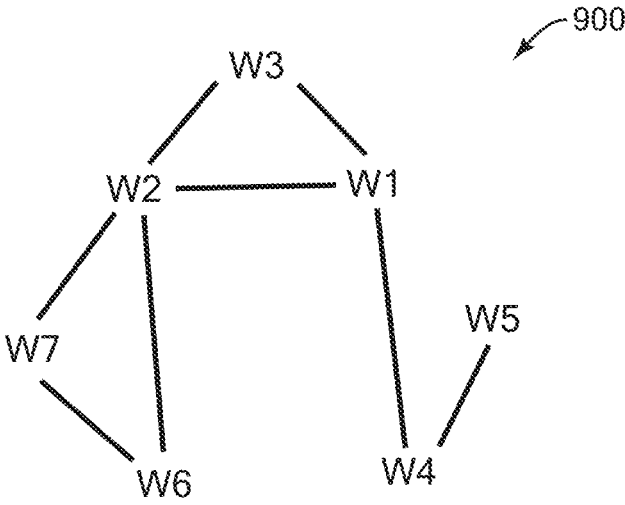

For example, FIG. 9 shows an example of a graph 900 generated from a set of eight content items that are each associated with two suggestion tokens (e.g., that may have been pruned as described for block 308), where prefixes P1 to P8 are each associated with two words as follows: P1-W2, W3; P2-W1, W4; P3-W2, W6; P4-W4, W5; P5-W1, W3; P6-W1, W2; P7-W2, W7; P8-W6, W7. Two designated display locations are provided in the user interface, and thus graph 900 should have 2 node classes. Graph 900 has a maximum degree of 4 (for node W2), and therefore needs more than 2 classes (in this case, a minimum of 3). Graph 900 can be adjusted to include only 2 classes by removing one or more edges. Node W2 has the maximum degree, and node W2 is connected to edges that are connected to nodes W1, W3, W6, and W7. These edges represent the prefixes P6, P1, P3, and P7, respectively.

If a particular edge, e.g., W1-W2, is removed from the graph, this allows W1 and W2 to be assigned the same class. The implication is that if the user inputs the prefix P6, the two predictions W1 and W2 now have the same class and only one of the predictions W1 and W2 will be displayed. Assuming that W1 is more probable than W2, word W1 will be displayed. The cost of deleting this edge is therefore P(W2|P6).

Figure 10:
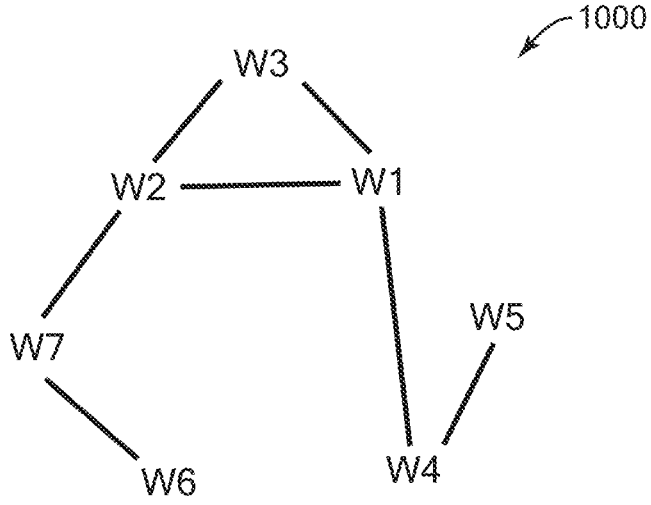

In the example of graph 900, it is assumed that the edge with the minimum cost is the edge between nodes W2 and W6. The removal of the edge results in graph 1000 as shown in FIG. 10.

Figure 11:
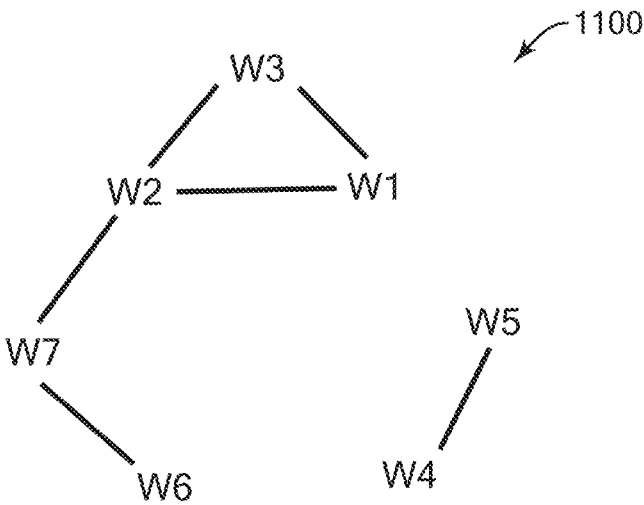

Since node W2 still has more than two edges, additional edges are removed. Now there are two contenders for maximum degree: W1 and W2. The cost of removing an edge can be calculated over the union of all edges connected to either of W1 or W2, and the edge that has the minimum cost is removed. In this example, the edge having the minimum cost is the edge between W1 and W4. The removal of this edge results in graph 1100 as shown in FIG. 11.

Figure 12:
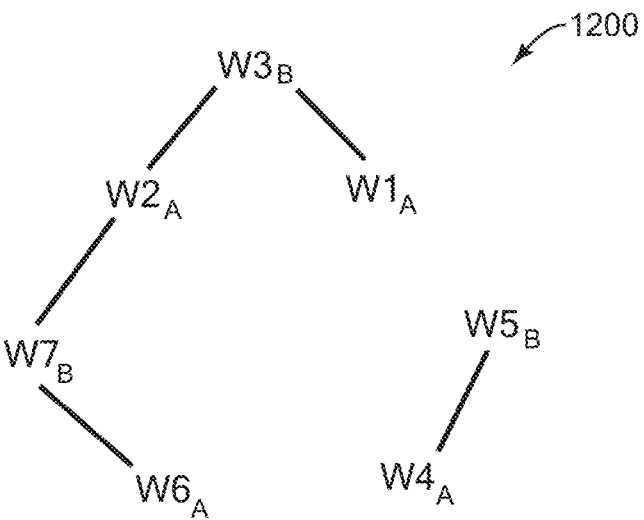

Graph 1100 still cannot be classified with only two classes due to node W2 having three edges. Thus, the edge removal technique is performed again, with node W2 having the highest degree. The cost of removing an edge can be calculated over the edges of W2, and the edge that has the minimum cost is removed. In this example, the edge having the minimum cost is the edge between W2 and W1. The removal of this edge results in graph 1200 as shown in FIG. 12. Graph 1200 can finally be classified with two classes, as indicated by the subscripts to the nodes of graph 1200.

One goal in the described edge removal is to minimize the total cost of removing a set of edges, such that the removal of the edges results in a graph that can be classified by a number of classes that is equal to (or less than) the number of available display locations in the user interface. However, the technique of removing edges as described above is a greedy algorithm and may not be optimal. For example, if edge W2-W7 is the lowest-cost edge in the graph 1100, that edge would be removed and the graph would still not be able to be classified with two classes. This would have then necessitated the further removal of edge W1-W2, resulting in a worse cost than if W1-W2 had been removed instead of edge W2-W7.

In some implementations, a different technique than the one described above can be performed in addition or alternatively, in which an exhaustive search is performed of all sets of edges that are needed to be removed to obtain an N-class graph, and the total cost is evaluated. This technique may be computationally expensive, but in some implementations it may be acceptable. For example, this processing can be a one-time computation, e.g., in a pre-processing stage such as in the method of FIG. 2. In some implementations, heuristics can be used that provide a search using techniques that lie between these two options of greedy search and exhaustive search in terms of processing and/or minimal cost, e.g., a partial search of edges and/or removal of qualifying edge(s) after partial search or analysis, which may result in a sufficient removal of edges to obtain a graph with the desired number of classes. The method continues to block 314.

In some implementations, the initial graph that was created prior to removal of any nodes and/or edges from the graph can be retained. The initial graph includes the total set of suggestion tokens for the set of content items, including all of the colliding suggestion tokens for each display location. The initial graph can be accessed in some implementations to access removed and lower priority suggestion tokens, e.g., if such removed suggestion tokens are to be displayed by the device (e.g., in alternative or vacant display locations in the user interface or elsewhere on a display of the device). In some implementations, removed (in block 308) and disassociated (in block 312) suggestion tokens can be stored in a table, list, or other data structure.

In some implementations, priority levels of removed suggestion tokens can be stored in the initial graph or an associated data structure to indicate which removed suggestion tokens have the highest priority, or priority levels can be stored in a different data structure (e.g., table, list, etc.). Such priority levels can be used in some implementations when displaying removed suggestion tokens in alternative or vacant display locations, as described below with reference to FIG. 4.

In block 314, it is determined whether to arrange the graph for proximal vacancies. In some implementations, lower-priority suggestion tokens that collide with higher-priority suggestion tokens can be displayed in vacant display locations near their designated display locations (e.g., see blocks 512-518 of FIG. 5). In some implementations, the graph created in method 300 can be arranged or adjusted to provide vacant display locations that are near to designated display locations of suggestion tokens. In some implementations, a user can select an option or device setting as to whether such vacant display locations are to be used in this way.

If such graph arrangement is not to be performed, the method continues to block 316, in which each class of the nodes (suggestion tokens) in the graph is associated with a respective display location in the user interface, to create a suggestion map of suggestion tokens to display locations. In some implementations, the suggestion map is a table (or other data structure) that is separate from the suggestion graph and that includes the entire set of suggestion tokens and the respective designated display locations for those suggestion tokens based on the classes of the suggestion graph. In some implementations, this allows the suggestion map to be small in storage size compared to the suggestion graph (e.g., edge information is not stored in the table). For example, the separate suggestion map may be easier to maintain in the low amount of available memory of some client devices such as low-end mobile phones, tablets, or other devices. In some implementations, the suggestion graph can itself be provided as a suggestion map; e.g., classes in the graph can be assigned to display locations in the user interface and these assignments can be stored in the graph. In some implementations, the graph may require a larger amount of storage and be more memory-consuming than a separate suggestion map described above. In some implementations, block 316 is omitted in method 300 and the assignment of classes to display location is performed when determining suggestion tokens and/or display locations, e.g., by method 400. In some implementations, each suggestion token can be assigned to any available display location, as long as the same suggestion token is consistently assigned to the same designated display location for all content items.

For example, in the example graph 600 of FIG. 6, if there are at least three display locations in the user interface, then the suggestion tokens can be displayed in consistent display locations of the user interface for any of the prefixes P1 to P4. In this example, W1 and W6 are assigned to display location 1, W2 and W4 are assigned to display location 2, and W3, W5, and W7 are assigned to display location 3. Thus, for each prefix, the display locations for the words are as follows:

Prefix P1: W1, W2, and W3 are assigned to display locations 1, 2, and 3, respectively;

Prefix P2: W1, W4, and W5 are assigned to display locations 1, 2, and 3, respectively;

Prefix P3: W6, W2, and W7 are assigned to display locations 1, 2, and 3, respectively;

Prefix P4: W1, W4, and W5 are assigned to display locations 1, 2, and 3, respectively.

The designation of each suggestion token to a respective display location forms the suggestion map that can be consulted to provide display of suggestion tokens in response to obtained content items, as described below with reference to FIG. 4.

If arranging the graph for proximal vacancies is to be performed as determined in block 314, the method continues to block 318, in which the graph is adjusted to provide proximal positioning of vacant display locations. In some implementations, vacant display locations (in which no suggestion token is designated for display for a given content item) can be used to display collided suggestion tokens that would otherwise not be displayed in the user interface because they are assigned the same display locations as higher priority suggestion tokens. In some examples, block 318 can assign specific classes of the graph to specific display locations, and can optimize for proximity of designated and vacant locations for all collisions between suggestion tokens. Block 318 can be more important in user interfaces having a large number of display locations in the designated display area, e.g., a larger grid of display locations, where display locations can have significant distance between them. A large distance between the designated display location and a secondary display location for a suggestion token is typically not desired since the user is habituated to look for (and/or move a hand or finger to) the designated display location to find that suggestion token. Thus, a vacant display location is most useful to display a suggestion token if it is near to the designated display location of that suggestion token.

Block 318 can include determining which suggestion tokens are colliding suggestion tokens. Colliding tokens may exist in the graph if pruning nodes and disassociating edges in blocks 308 and 312 did not reduce the number of node classes in the graph to the number of available display locations. Block 318 can also include determining if and where there are vacant locations in the designated display locations for groups of suggestion tokens that have colliding suggestion tokens. In some examples, the set of content items and the total set of suggestion tokens is processed to determine the designated display locations of the suggestion tokens associated with each content item and to determine vacant display locations in the user interface that exist for each content item. In some examples, tuples can be created, each tuple including a collision location and a vacant location that can be used with that collision location, e.g., each tuple being a list. In some examples, if there are 3 colliding suggestion tokens for a colliding display location, and 4 possible vacant locations where these colliding predictions can be placed, 12 tuples (4 vacant locations for each colliding suggestion token) can be formed for the colliding display location.

This display location information (e.g., tuples or lists) can be evaluated as to which arrangement of classes to display locations (e.g., 100 classes to a grid of 10×10 locations) for the graph provides the most proximal positioning of vacant display locations to designated display locations. The classes of nodes of the graph are adjusted to provide this proximal positioning, if possible. In some implementations, the graph can be constructed (e.g., in block 302) or classified (e.g., in block 304) with this proximal positioning as a constraint for assigning classes or nodes to suggestion tokens, rather than performing block 318 separately as shown in FIG. 3.

In some implementations, an upper limit in proximity, or maximum threshold distance, to designated display locations can be used for placement of vacant display locations. For example, a colliding suggestion token can be assigned to a vacant display location only if the vacant display location is within a radius of a particular number of display locations (e.g., number of cells of a grid) from the designated display location of that suggestion token. In some implementations, such a constraint can provide more computational efficiency in arranging the colliding and vacant display locations in block 318. For example, the number of display locations can be 1, or a larger number. In some implementations, the proximity of vacant display locations to designated display locations can be estimated as the Cartesian distance between the vacant and designated locations. For example, this Cartesian distance can be used for larger designated display areas, e.g., 8×8 or 10×10 grids of display locations.

After block 318, the method continues to block 316 to designate each suggestion token for a respective display location (the adjusted graph can associate classes with display locations as a result of block 318 as described above). In various implementations, the mapping of suggestion tokens to display locations can be stored in a table or other data structure separate from the graph, or the mapping can be stored in the graph, similarly as described above for block 316.

Figure 4:
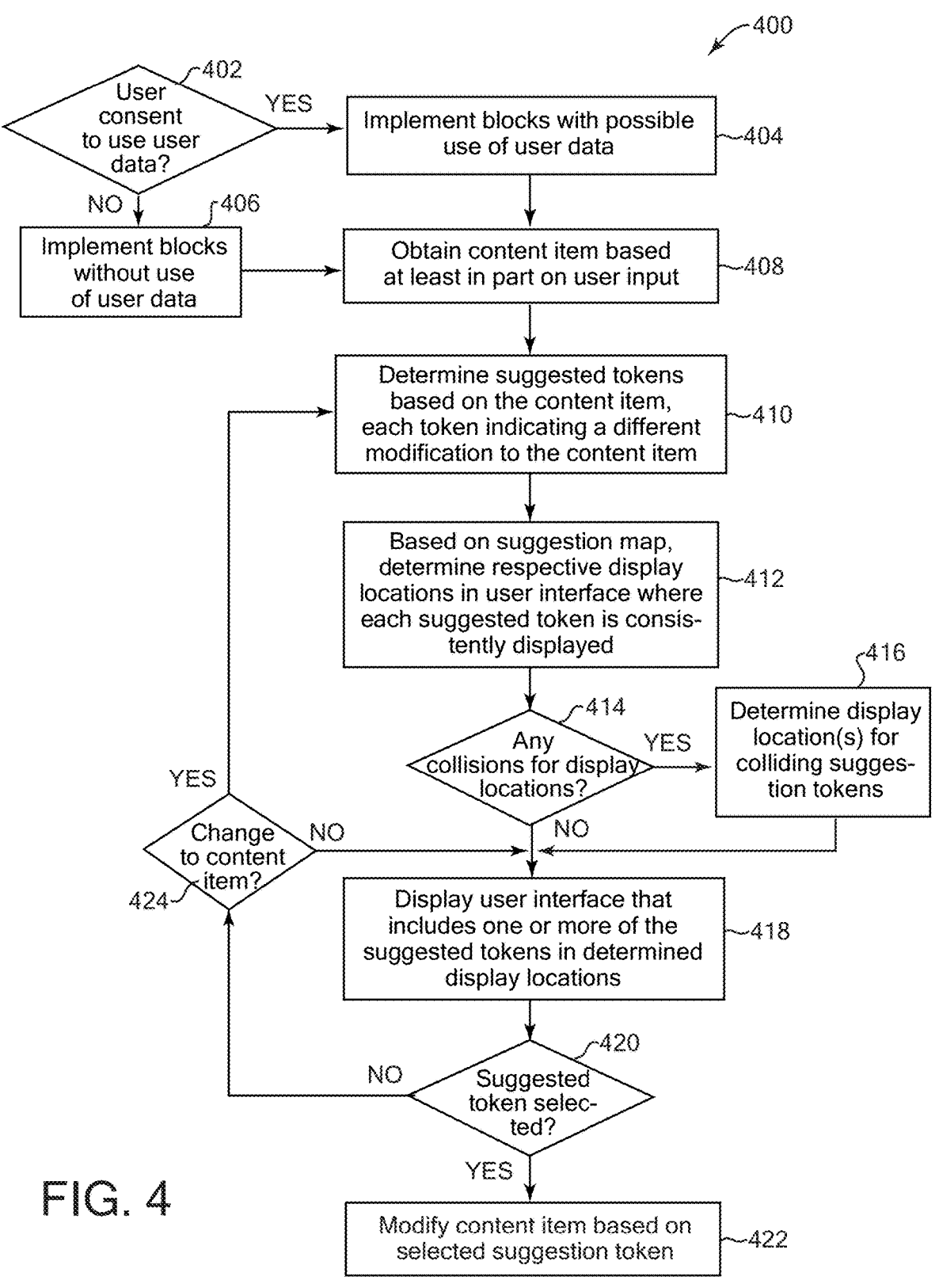
FIG. 4 is a flow diagram illustrating an example method to generate user content modification suggestions at consistent display locations and modify user content based on selection of suggestions, according to some implementations.

FIG. 4 is a flow diagram illustrating an example method 400 to generate user content modification suggestions at consistent display locations and modify user content based on selection of suggestions, according to some implementations. In some implementations, method 400 can be implemented on a server, e.g., server system 102 as shown in FIG. 1. In some implementations, some or all of the blocks of method 400 can be implemented on one or more client devices (e.g., client devices 120, 122, 124, or 126 as shown in FIG. 1), one or more server devices, and/or on both server device(s) and client device(s). In described examples, the system(s) implementing the blocks of method 400 include one or more processor hardware or processing circuitry ("processors"), and can access one or more storage devices such as database 106 or other accessible storage. In some implementations, different components of one or more server systems can perform different blocks or portions of blocks.

Method 400 can provide suggestions or predictions (e.g., suggestion tokens) in response to receiving one or more content items at a device. Method 400 can access a suggestion map, such a data structure (e.g., graph) described with reference to FIGS. 2 and 3, to determine display locations for suggestion tokens that are displayed in response to receiving a content item, e.g., via input by a user. In some implementations, the suggestion tokens are selectable by user input to modify the content item, e.g., complete a phrase, convert a word to a symbol, etc.

Some implementations can initiate method 400 based on user input. A user may, for example, have selected the initiation of the method 400 from a displayed user interface. In some implementations, method 400 or portions thereof can be performed with guidance by the user via user input. In some implementations, the method 400, or portions of the method, can be initiated automatically by a device. For example, the method (or portions thereof) can be periodically performed or performed based on the occurrence of one or more particular events or conditions. For example, such events or conditions can include obtaining one or more content items that have been received from another device, and/or one or more other events or conditions occurring which can be specified in settings of a device implementing method 400. In some examples, a device (server or client) can perform the method 400 with access to a collection of accessible content items and suggestion tokens (if user consent is received).

In block 402, it is checked whether user consent (e.g., user permission) has been obtained to use user data in the implementation of method 400. For example, user data can include user preferences, user biometric information, selections of suggestion tokens, suggested responses, or other content in user interfaces of a device, or other content data items in a content collection (e.g., images captured, received, accessed, or otherwise associated with a user), messages sent or received by a user, information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use user data in some implementations.

If user consent has been obtained from the relevant users for which user data may be used in the method 400, then in block 404, it is determined that the blocks of the methods herein can be implemented with possible use of user data as described for those blocks, and the method continues to block 408. If user consent has not been obtained, it is determined in block 406 that blocks are to be implemented without use of user data, and the method continues to block 408. In some implementations, if user consent has not been obtained, the remainder of method 400 is not performed, and/or particular blocks using the user data are not performed. In some implementations, if user consent has not been obtained, blocks of method 400 are to be implemented without use of user data and with generic or publicly-accessible and publicly-usable data.

In block 408, a content item is obtained based at least in part on user input. For example, user input can be received that provides or includes a content item (or one or more content items, in some implementations). For example, a content item can include content that a user can input, e.g., to a user interface of a device. For example, a content item can include one or more characters, words, symbols, emojis, or other content. In some examples, a content item can be a "prefix" of one or more text words or phrases (or other content) input by the user, as a portion of a complete phrase. In some examples, a content item can be or include a text form of one or more symbols, emojis, or characters, that can be replaced by an equivalent symbol, graphical character, image, video, etc. In some implementations, a content item can be or include context information derived from a context of the user or the device, similarly as described above with reference to FIG. 2.

The user input that provides the content item can be in a variety of forms. In some implementations, the user input can include touch on a touchscreen, e.g., presses on keys of a displayed keyboard or other displayed buttons, swiping or other finger gestures, etc. In some implementations, the user input can include movement of a device such as a mouse, joystick, trackball, etc. In some implementations, the user input can include voice commands or voice data spoken by the user which is received by a microphone of the device. In some implementations, the user input can include the user's eye gaze input on displayed controls, e.g., detected by cameras or other devices. Block 408 may be followed by block 410.

In block 410, one or more suggestion tokens are determined for the content item obtained in block 408. Each suggestion token can indicate a different possible or likely modification to the obtained content item. For example, each suggestion token can include one or more words, phrases, symbols, and/or other predicted forms that indicate completions or modifications to the obtained content item. In some examples, if the content item is a prefix of a text words or a phrase input by the user, each of the one or more determined suggestion tokens can be a predicted completion of that prefix. For example, a content item can be a phrase "Let's go to the", and suggestion tokens for this content item can be determined to be "store," "park," "beach," "car," "party," etc., which are predicted to be likely completions to the content item phrase based on common phrases in a corpus of text. In other examples, the prefix can be a portion of a word and the suggestion tokens are possible likely completed words of that word portion, based on the particular characters of the word portion. For example, if the prefix is "ca", possible suggestion tokens can include "cat," "calculator," "calendar," "car," etc. In some examples, a suggestion token can be a replacement for a content item. For example, if the content item is a word that is a text spelling of a Chinese character using Roman letters, a suggestion token for that content item can be a graphical symbol, e.g., a Chinese character, that is an equivalent to and can replace that word.

The suggestion tokens can be determined for the content item using any of a variety of techniques, similarly as described for block 210 of FIG. 2. Some example techniques include use of machine learning models, graph-based models, other types of models, heuristics and rules (used instead of or in addition to machine learning models), an N-gram model, etc. In some examples, probabilities are assigned to the probability of a word (or character, symbol, etc.) occurring next in a sequence of words or other content data. Block 410 may be followed by block 412.

In block 412, a suggestion map is accessed and respective display locations in a user interface are determined as to where each suggestion token is consistently displayed. These are designated display locations associated with the suggestion tokens determined in block 410. In some implementations, the suggestion map indicates a respective display location for each suggestion token, e.g., a table, graph, or other data structure that indicates the designated display locations for the suggestion tokens. For example, a suggestion map as described with reference to FIGS. 2 and 3 can be accessed in block 412. In some implementations, the suggestion map may have been downloaded to the local storage of the device implementing method 400 (e.g., a client device) prior to block 412, and block 412 accesses the locally-stored suggestion map. For example, in some implementations, the suggestion map is a table that can be downloaded and stored in local memory prior to block 412. In some implementations, a suggestion graph similar to examples described in FIG. 3 can be downloaded to local memory as the suggestion map or in addition to a suggestion map that is a separate table. In some implementations, the suggestion map may be remotely stored, e.g., on a server or other device connected via a communication network, and block 412 accesses the remote suggestion map via the network, e.g., obtains, over the network, the display locations associated with the determined suggestion tokens.

A suggestion graph can also or alternatively be adjusted and/or used in block 412 (or at other times) for determining designated display locations for new suggestion tokens that are not currently present in the set of suggestion tokens. For example, the classes assigned to suggestion tokens in the graph can be adjusted to assign a designated display location to a new suggestion token (e.g., a proper noun or name) that has been input by the user, e.g., by re-determining classes for graph nodes similarly as described for FIG. 3. In various implementations, a locally-stored graph can be adjusted by the device that performs method 400, and/or a remote device can store the graph and update the graph, e.g., based on data (such as new suggestion tokens) received from the device performing method 400 and sent to the remote device. Block 412 may be followed by block 414.

In block 414, it is determined whether there are any collisions among the designated display locations determined in block 412 that cause one or more suggestion tokens to be unable to be displayed. A collision occurs if two or more of the suggestion tokens have the same designated display location in the user interface, e.g., multiple suggestion tokens are each designated to be displayed in the same display location that can display only a single suggestion token. If no collisions have occurred among the determined suggestion tokens, the method continues to block 418, described below. If one or more collisions has occurred among the determined suggestion tokens, the method continues to block 416.

In some implementations, multiple suggestion tokens can be displayed in a single display location of the user interface, e.g., in a single cell of a grid of cell locations (for example, if a display location is sufficiently large to show multiple suggestion tokens that can each be easily selected by touch selection of a user). For example, the area of a display location can be subdivided into two or more sub-locations within the area, e.g., with borders, different colors, textures, etc., or other visual features that indicate there are multiple selectable locations displayed within a single standard display location of the user interface. For example, two sub-locations can be displayed by dividing a standard cell in a grid in two and displaying each sub-location in a different half of the cell. In some implementations, a designated display location can be displayed larger to accommodate such multiple areas within the display location. In implementations that use such multiple areas, block 414 can determine whether there are collisions among the suggestion tokens that are not able to be displayed in sub-locations of a single display location, e.g., whether there are more collisions than sub-locations for a display location. In some implementations, the number of sub-locations that can be displayed within a display location is small, e.g., 2-4, to allow the sub-locations to be sufficiently large to allow a user to select any of the sub-locations easily without unintentionally selecting one or more adjacent sub-locations. In some implementations, multiple colliding suggestion tokens associated with a designated display location can be displayed in a menu, list, or other display area that is initially hidden from view, and is displayed in response to selection of the designated display location by a user (e.g., similarly to a drop-down menu). A user can select a desired suggestion token from the displayed menu, after which the menu is removed from the user interface.

In block 416, after determining in block 414 that one or more colliding suggestion tokens cannot be displayed in their designated display location(s), display locations can be optionally determined for one or more of the colliding suggestion tokens. Alternatively, in some implementations, no display locations are determined for one or more of the colliding suggestion tokens, e.g., these suggestion tokens are to be hidden from display by the device. Some examples of determining alternative display locations for colliding suggestion tokens are described below with reference to FIG. 5. The method may continue to block 418.

In block 418, the user interface is displayed that includes displayed suggestion token(s) associated with the content item obtained in block 408, the suggestion tokens displayed in determined display locations. One or more of the suggestion tokens determined in block 410 are displayed in their designated display locations from the suggestion map, and/or are displayed in other display locations of the user interface or device display as determined in block 416.

In some implementations, the suggestion tokens can be displayed in a spatial layout in a designated display area of the user interface. In various implementations, the spatial layout can be a rectangular grid, a circular display area, or other shape, form, or geometric configuration of display area. Some spatial layouts can be more suited than others to providing alternative or proximal vacant locations that display colliding suggestion tokens described with reference to FIG. 5, e.g., such that vacant locations can be positioned closer to designated display locations. In some implementations, the designated display area can be adjacent to or near to an input display area, such as a displayed keyboard or other area having selectable buttons. In some implementations, the designated display area can be adjacent or near to an input field that displays a content item that has been and/or is being input by a user. The method may continue to block 420.

In block 420, it is determined whether one of the displayed (or otherwise presented) suggestion tokens is selected. For example, user input from a user can select a suggestion token that is displayed in the user interface, or a displayed suggestion token can be selected via an application program or other program. In some implementations, user selection input can include touch of a user on a touchscreen in an area corresponding to the displayed suggestion token, e.g., as a button or selectable area or field. In some implementations, user selection input can include movement of a device such as a mouse, joystick, trackball, etc., causing a cursor or pointer to move onto the displayed suggestion token, followed by user selection of a physical input control (e.g., button) on the device. In some implementations, user selection input can include a voice command spoken by the user that indicates a suggestion token for selection. In some implementations, user selection input can include the user's eye gaze input detected on a display location.

If a suggestion token is not selected as determined by block 420, the method continues to block 424, described below. If a suggestion token is selected, the method continues to block 422, in which the content item obtained in block 408 is modified based on the selected suggestion token. For example, if the content item is a portion of a phrase in an input field, the selected suggestion token can be a complete phrase that includes the phrase portion, and the modification can include replacement of the phrase portion with the complete phrase in the input field. If the content item is a portion of a word, the selected suggestion token can be a complete word that includes the word portion, and the modification can include replacement of the word portion with the complete word in the input field. In some implementations, the suggestion token can be a remaining portion following an obtained phrase portion or word portion, and the modification can include adding the remaining portion to the obtained portion. If the content item is a word or phrase, the selected suggestion token can be a symbol or image that represents the word or phrase in alternate form, and the modification can include replacement of the word or phrase with the symbol or image in the input field. In some implementations, if the content item is or includes a different form of content data (e.g., an image, a video, a location, etc. without text, characters, or symbols), the modification can include modifying the content data based on the selected suggestion token or associating the selected suggestion token with the content data (e.g., associating a label or name token with image or location content data such as tagging the content data with the suggestion token in metadata of the content data, associating an image token with image content data as a group of images, etc.).

If a suggestion token is not selected at block 420, the method continues to block 424, in which it is determined whether there are one or more changes to the content item obtained in block 408. For example, the change can include additional user input (or input from another source) that adds further content to (or otherwise changes) the content item obtained in block 408. For example, the user may have input one or more characters that are added to the end of a word content item obtained in block 408, input one or more words that are added to the end of a phrase content item, changed all or a portion of the content item obtained in block 408 (e.g., replaced the entire content item with a new content item), etc. If there is change to the content item, the method continues to block 410 to determine suggestion tokens based on the changed content item. As described herein, most or all of the suggestion tokens determined for the changed content item can be displayed in display locations in the user interface consistent with the display locations for previous content item(s). If there is no additional user input, the method continues to block 418 to continue to display the user interface that includes the one or more suggestion tokens in display locations of the user interface.

The method 400 of FIG. 4 allows a suggestion token to be displayed consistently in a single display location in the user interface, regardless of the content item that has been obtained in block 408. In one example, after a first content item is obtained in block 408, a second, different content item is obtained that replaces the first content item (e.g., does not add to the first content item). A suggestion token displayed in a particular display location in the user interface for the first content item is displayed in the same display location for the second content item. This allows, for example, a user to train muscle memory and/or eye gaze memory to find particular suggestion tokens at consistent display locations, thereby increasing speed and accuracy of the input of data received from users.

Figure 5:
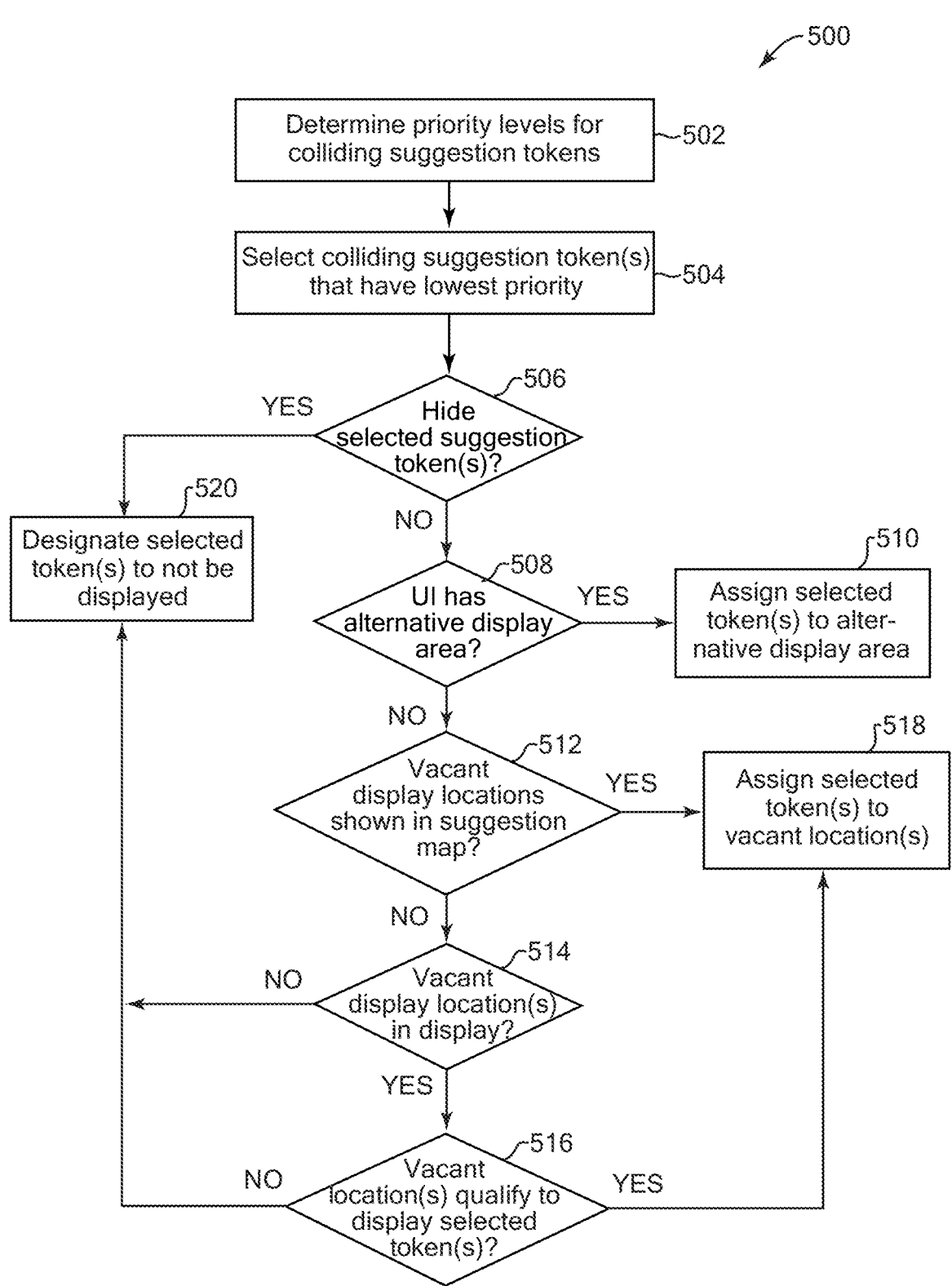
FIG. 5 is a flow diagram illustrating an example method to determine display locations for colliding suggestion tokens, according to some implementations.

FIG. 5 is a block diagram illustrating an example method 500 to determine display locations for colliding suggestion tokens, according to some implementations. For example, method 500 can be implemented as part of block 416 of FIG. 4. Method 500 is described herein with respect to a single designated display location in the user interface for which multiple suggestion tokens collide; method 500 can also be performed for each designated display location that has colliding suggestion tokens.

In block 502, priority levels are determined for colliding suggestion tokens associated with a designated display location. A priority level can be assigned to each colliding suggestion token associated with the designated display location. For example, a designated display location that has colliding suggestion tokens can be associated with a respective priority scale and a different priority level in that scale can be assigned to each of the colliding suggestion tokens. The priority levels can be determined based on any of one or more characteristics of the colliding suggestion tokens. For example, priority level can be based on the probability that the suggestion token will be selected (e.g., by a user) to modify the associated content item. In some examples, this probability can be provided by the process (e.g., block 210) that determines suggestion tokens for content items and can be based on, e.g., the frequency that the suggestion token has been selected by users (or alternatively, by the particular user of the device) when displayed as a suggestion for a given content item. In some implementations, priority levels can be based on one or more other characteristics of the suggestion tokens, e.g., the recency that a suggestion token has been selected by the user (e.g., more recent selection can have higher priority), the recency that the suggestion token has been displayed in the designated display location (e.g., more recent display in this location can have higher priority), the length or size (e.g., number of characters) of the suggestion token (e.g., a size that more appropriately fits in an allocated display area of the designated display location or of an alternative display location can have higher priority), etc.

In some implementations, priority levels of the suggestion tokens can be determined based on multiple characteristics of the suggestion tokens. For example, an overall priority level can be determined based on an individual priority level for each characteristic. In some examples, a total score can be a sum of individual scores, where each individual score is determined for a different characteristic. For example, an overall priority level can be determined based on a sum of a score for probability and a score for recency of selection of a given suggestion token.

In some implementations, colliding suggestion tokens and/or priority levels may be stored in the suggestion map used to determine display locations (as described in FIGS. 2-4), or stored in a data structure associated with the suggestion map as described above with reference to FIG. 2, and the suggestion tokens and priority level information can be accessed and retrieved from such a map or data structure in block 502. Block 502 may be followed by block 504.

In block 504, the colliding suggestion tokens that have the lowest priority levels are selected. The selected suggestion tokens will not be displayed in the designated display location associated with these suggestion tokens. In some implementations, all colliding suggestion tokens are selected in block 504 except the colliding suggestion token having the highest priority level for the display location (e.g., if the designated display location for the colliding suggestion tokens displays a single suggestion token). In some implementations, multiple colliding suggestion tokens can be excluded from selection if multiple suggestion tokens can be displayed in the designated display location (e.g., in sublocations as described above with respect to FIG. 4). In some implementations, one or more colliding suggestion tokens can be randomly selected instead of being assigned priority levels and selecting the lowest priority suggestion tokens. Block 504 may be followed by block 506.

In block 506, it is determined whether to hide the selected colliding suggestion tokens. In some implementations, the selected suggestion tokens are hidden from view such that they are not displayed in the user interface or by the device. If such hiding is to be implemented in method 500, the method continues to block 520, described below. In some implementations, hiding of the selected suggestion tokens can be performed based on a setting or user preference provided by the device and selected by the user of the device. If the selected colliding suggestion tokens are not to be hidden, e.g., one or more of the selected suggestion tokens are to be displayed in alternative or vacant display locations, then the method continues to block 508.

In block 508, it is determined whether the user interface includes an alternative display area that includes one or more alternative display locations. In some implementations, one or more selected colliding suggestion tokens can be displayed in an alternative display area that is located in a different location than the designated display area that includes the usual or standard designated display locations for suggestion tokens. If the user interface does not include an alternative display area, the method continues to block 512, described below. If the user interface includes an alternative display area, the method continues to block 510.

In block 510, one or more of the selected suggestion tokens are assigned for display in respective alternative display locations in the alternative display area. The alternative display area can be a display area of the user interface, or of the display screen of the device, that is different than the designated display area that includes the designated display locations for suggestion tokens. For example, if the designated display area is a grid displayed above a displayed keyboard in a user interface on a display screen, an alternative display area can be located away from the grid in a different area of the user interface, such as above the grid, to the side of the grid or keyboard, at the top of the user interface or screen, etc.

In some implementations, the alternative display area can include a spatial arrangement (e.g., grid) of display locations that corresponds at least approximately to the spatial arrangement (e.g., grid) of the standard display locations. For example, the alternative display area can be a smaller version of the designated display area that has fewer display locations than the designated display area. In some implementations, one or more selected collided suggestion tokens can be assigned for display in an alternative display location in the alternative display area that approximately or exactly corresponds to the designated display location in the designated display area for those suggestion tokens (if such a location is available). For example, if the designated display location for a selected suggestion token is a lower left corner of the designated display area, the selected suggestion token can be assigned for display in an alternative display location in the lower left corner of the alternative display area. This can allow a user to find a suggestion token in the alternative display area in a location similar to or corresponding to the location the user is accustomed to finding that suggestion token.

In some implementations, one or more (e.g., all) selected suggestion token(s) that are not assigned for display in alternative display locations can be hidden from display similarly as described for block 520. For example, the alternative display area may not have enough display locations to display all of the selected suggestion tokens, such that only the highest priority selected suggestion tokens are assigned for display in the alternative display area. In various implementations, after block 510, the method can return to method 400 or can continue to block 502 to process colliding selection tokens for a different content item.

In block 512, it is determined whether there are available vacant locations indicated in the suggestion map used to determine the display locations of suggestion tokens, or indicated in an associated data structure, e.g., suggestion graph, table, list, etc. In some implementations, e.g., as described above with respect to block 318 of FIG. 3, the graph that is used to determine display locations for suggestion tokens may have been created or arranged to indicate vacant locations for colliding suggestion tokens. For example, the vacant locations may be within a threshold distance of the designated display locations for those suggestion tokens so that colliding suggestion tokens can be displayed near to the locations that they are customarily displayed in the user interface. If available vacant locations are indicated in the suggestion map or graph, the method continues to block 518, described below. If available vacant locations are not indicated in the suggestion map or graph, the method continues to block 514. In some implementations, vacant display locations in the designated display area are not used to display collided suggestion tokens, e.g., regardless of whether qualifying vacant locations are available.

In block 514, it is determined whether there are any vacant display locations in the designated display area of the user interface. Block 514 can be performed in some implementations if vacant locations of the designated display area are enabled to display colliding suggestion tokens, and the suggestion map does not indicate such vacant locations. If there are no vacant display locations in the designated display area, the method continues to block 520, described below. If there are one or more vacant display locations in the designated display area, the method continues to block 516.

In block 516, it is determined whether the one or more vacant display locations qualify to display the selected suggestion tokens. In some implementations, a vacant location qualifies to display a selected suggestion token if the vacant location has a particular characteristic. For example, the characteristic can be that the vacant location is located within a threshold distance (or radius) of the designated display location associated with the selected suggestion token. This would allow the selected suggestion token to be displayed close to the location where it is typically displayed in the user interface and where the user is accustomed to finding it. For example, in various implementations, the threshold distance can be 1 cell, 2 cells, or other cell distance in a grid of display locations, can be a number of pixels from the designated location, can be a Cartesian distance similarly as described above for block 318, etc. In some implementations, a vacant location can qualify to display a selected suggestion token based on alternative or additional characteristics, e.g., being within a same row or column of display locations as the designated display location in a display area that is a grid, etc. In some implementations, a vacant location always qualifies to display a selected suggestion token, e.g., regardless of its characteristics such as location in the designated display area. If there are no qualifying vacant display locations, the method continues to block 520, described below. If there are qualifying vacant display locations, the method continues to block 518.

In block 518, one or more of the selected suggestion tokens are assigned for display in associated vacant display locations. The vacant display locations may have been obtained from a suggestion map, graph, or other data structure as described for block 512, or may be qualifying vacant locations determined in blocks 514 and 516. In some implementations, selected suggestion token(s) that are not displayed in vacant display locations can be hidden from display similarly as described for block 520. For example, there may not be enough qualifying vacant display locations to display all of the selected suggestion tokens, such that only the highest priority selected suggestion tokens are displayed in vacant display locations. In various implementations, after block 518, the method can return to method 400 or can continue to block 502 to process colliding selection tokens for a different content item or a different designated display location.

In block 520, one or more selected colliding suggestion tokens are designated to be hidden from display in the user interface or by the device. In various implementations, all or a subset of the selected suggestion tokens can be designated to be hidden from display. For example, in some implementations, all selected suggestion tokens are colliding suggestion tokens that have a lower priority than the highest priority suggestion token and these can be hidden from display by the device, thus causing only the highest priority (e.g., the highest probability) suggestion token of the colliding suggestion tokens to be assigned for display at the designated location. In some implementations, a subset of the selected suggestion tokens can be designated to not be displayed in block 520, e.g., based on processing in block 510 or block 518 described above. In various implementations, after block 520, the method can return to method 400 or can continue to block 502 to process colliding selection tokens for a different content item.

The methods, blocks, and operations described herein can be performed in a different order than shown or described in FIGS. 2-5, and/or performed simultaneously (partially or completely) with other blocks or operations, where appropriate. For example, blocks 506, 508, and the group of blocks 512-516 of FIG. 5 can be performed in a different order than shown in the example of FIG. 5, and/or partially or completely simultaneously. In some examples, the method can check for vacant display locations in blocks 512-516 prior to (or at least partially simultaneously with) checking for alternative display locations in block 508, etc.

Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

One or more methods disclosed herein can operate in several environments and platforms, e.g., as a stand-alone computer program that can run on any type of computing device, as a mobile application ("app") run on a mobile computing device, etc.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations of a method can be performed within the mobile app (and/or other apps) on the mobile computing device. In another example, computations can be split between the mobile computing device and one or more server devices.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and the operating system.

Figure 13:
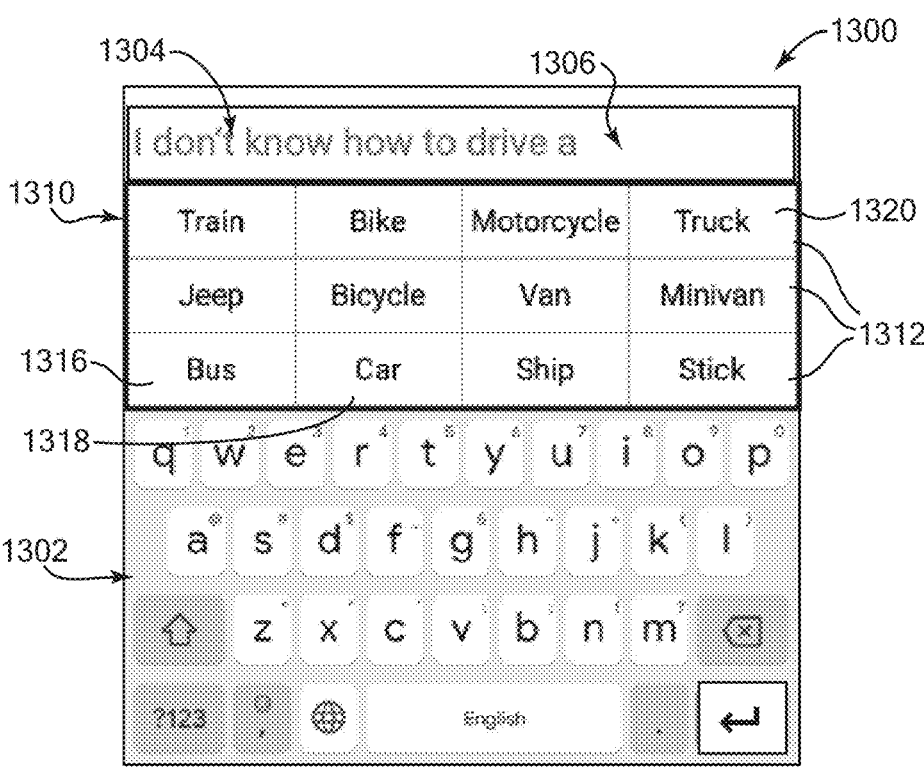
FIGS. 13-14 are diagrammatic illustrations of a user interface displayed by a device and including suggestion tokens displayed at consistent locations in the user interface.

FIG. 13 is a diagrammatic illustration of an example user interface 1300 displayed by a display screen of a device, in which suggestion tokens are provided for a content item that has been input by a user of the device. In this example, a keyboard 1302 is displayed on a touchscreen of a device, e.g., a smartphone or other mobile device. A user can select the keys of the keyboard (e.g., via the touchscreen) to input a content item 1304 in an input field 1306 of the user interface 1300 that is displayed above keyboard 1302. In this example, content item 1302 is "I don't know how to drive a", which is a prefix to a text phrase.

User interface 1300 also displays a designated display area 1310 that includes multiple suggestion tokens. The suggestion tokens are displayed in cell locations 1312 in the display area 1310 that is shown as a grid of the cell locations 1312, where each cell location includes a suggestion token word that has been determined by the device as a possible and likely word to follow or end the phrase of content item 1304. In this example, each suggestion token word is displayed in a respective cell location 1312 in which it has been consistently displayed for previous input content items, e.g., a cell location which is the designated display location for the suggestion token.

The user can select any of the cell locations 1312 (12 cells shown in this example) to cause the word in that cell location to be appended to the end of the content item 1304 and be displayed at the end of the content item in input field 1306. For example, if the user selects the cell location 1316 that displays the word "Bus," the word "Bus" is appended to the end of content item 1304 and is displayed in that position in display field 1306, thus forming the phrase, "I don't know how to drive a Bus". Similarly, a content item ending with the word "Car" is produced if the user selects cell location 1318 having the word "Car".

Figure 14:
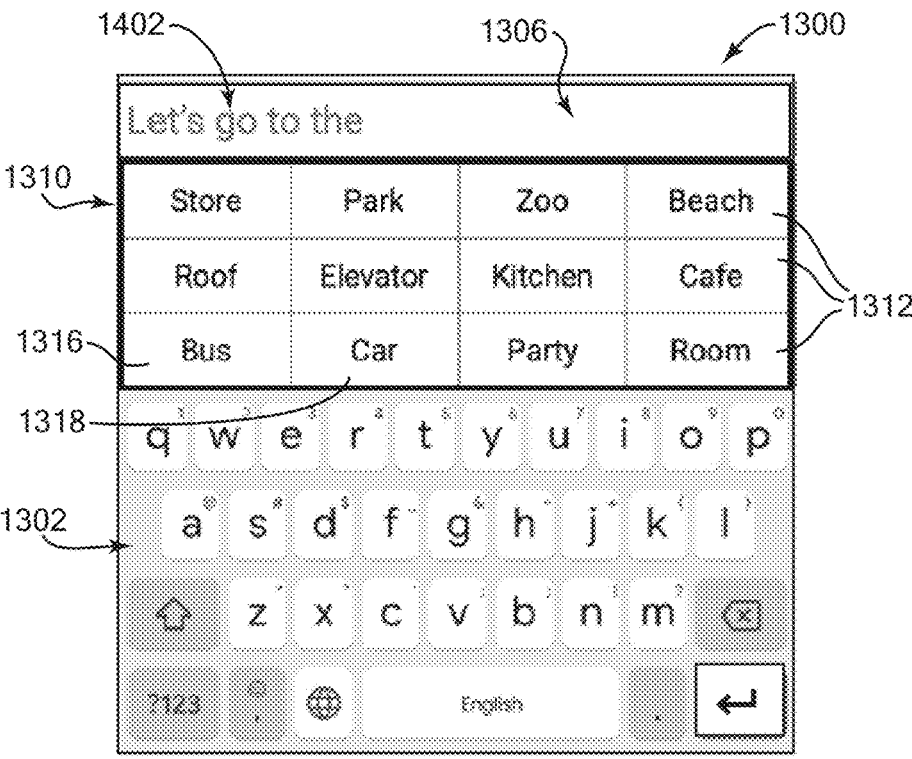

FIG. 14 is a diagrammatic illustration showing the example user interface 1300 of FIG. 13, in which a content item 1402 has been input by the user of the device using keyboard 1302. Content item 1402 is a second content item that is different than the (first) content item 1304 of FIG. 13 and replaces content item 1304 in field 1306 (e.g., does not add to the first content item 1304). In this example, content item 1402 is "Let's go to the", which is a prefix to a text phrase. In response to the input of content item 1402, user interface 1300 displays multiple suggestion tokens 1404 in cell locations 1312 of designated display area 1310, where each cell location 1312 includes a word that has been determined by the device as a possible and likely word to follow or end the phrase that is content item 1402.

Similarly as for content item 1304 in FIG. 13, each suggestion token word is displayed in a respective cell location 1404 in which it has been consistently displayed for previous input content items. Most of the determined suggestion tokens for content item 1402 are different than the suggestion tokens for content item 1304 of FIG. 3. Thus, most of the cell locations 1312 of FIG. 4 display different suggestion token words than cell locations 1312 of FIG. 13. Any suggestion tokens that recur in the display area 1310 of FIG. 14 from the display area of FIG. 13 are displayed in the same cell locations 1312 as shown in FIG. 13. For example, the suggestion tokens "Bus" and "Car" are the same suggestion tokens displayed in FIG. 13 for content item 1304, and are displayed in the same cell locations 1316 and 1318 in the display area 1310 of FIG. 14 as in the display area 1310 of FIG. 13. This allows the user to become familiar with consistent display locations of suggestion tokens regardless of which content items causes those suggestion tokens to be displayed, allowing a muscle memory or view memory of the user to be trained. The user can select any of the cell locations 1404 in display area 1310 (12 cells shown in this example) to cause the word in that cell to be appended to the end of the content item 1402 and be displayed at the end of the content item in input field 1306, similarly as described for FIG. 13.

Figure 15:
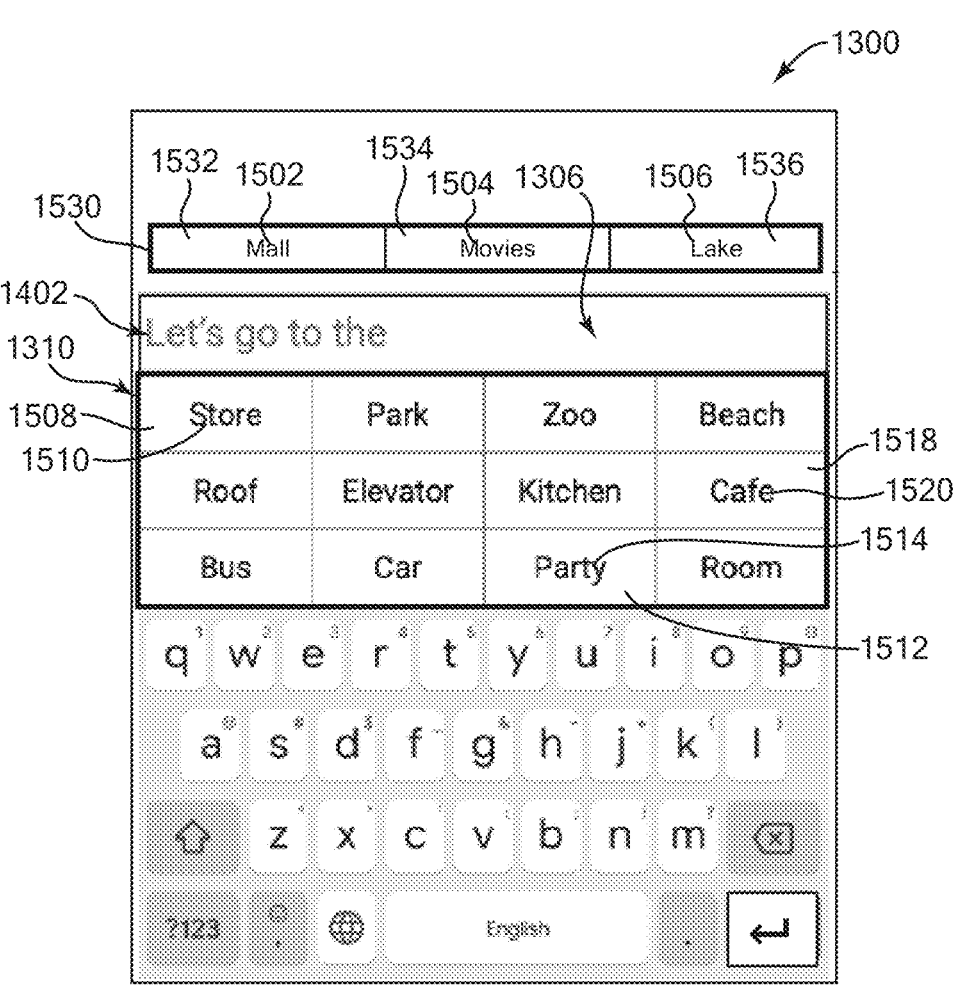
FIGS. 15-16 are diagrammatic illustrations of a user interface displayed by a device and including colliding suggestion tokens displayed at alternate locations in the user interface.

FIG. 15 is a diagrammatic illustration showing the example user interface 1300 of FIG. 13, in which the content item 1402 has been input by the user similarly as in FIG. 14 and in which colliding suggestion tokens are displayed in alternative display locations. In the example of FIG. 15, suggestion tokens fill the designated display area 1310 similarly as in FIG. 14. Three colliding suggestion tokens 1502, 1504, and 1506 were also generated in response to the content item 1402 (these colliding suggestion tokens may have also been generated in the example of FIG. 14, but were not displayed in that implementation of the user interface 1300). In this example, suggestion token 1502 ("Mall") has a designated cell location 1508, in which suggestion token 1510 ("Store") is also designated to be displayed. Suggestion token 1504 ("Movies") has a designated cell location 1512, in which suggestion token 1514 ("Party") is also designated to be displayed. Suggestion token 1506 ("Lake") has a designated cell location 1518, in which suggestion token 1520 ("Cafe") is also designated to be displayed. Colliding suggestion tokens 1502, 1504, and 1506 were determined to have lower priority than the respective colliding suggestion token displayed in their respective designated display location. For example, these suggestion tokens have a lower probability of being selected based on past user selections and/or frequency of occurrence of the phrases that include the content item 1404 and these words.

In this example, lower priority colliding suggestion tokens are displayed in alternative display area 1530. For example, alternative display area 1530 can be displayed above the input field 1306, as shown, or can be displayed in a different region or area of the user interface or display screen. In this example, the alternative display area 1530 is displayed less visually prominently than the designated display area 1310. For example, alternative display area 1530 has cells that have a smaller size, and/or the suggestion token words are displayed in a smaller font size in the alternative display area 1530 than in display area 1310. The lower visual prominence of the alternative display area 1530 can indicate that these are alternative suggestions for the content item 1402.

Further, in this example, the colliding suggestion tokens 1502, 1504, and 1506 are displayed at locations within alternative display area 1530 that at least partially correspond to their designated display locations in display area 1310. For example, the correspondence can be in the side of the display area (e.g., left side, right side, middle, or in some implementations, top side or bottom side if the alternative display area has multiple rows or more vertical area than area 1530). For example, suggestion token 1502 is displayed on the left side of alternative display area 1530 in a leftmost cell location 1532 since its designated display location 1508 is on the left side of display area 1310 and/or is closest to the left side of display area 1310 among the designated display locations of colliding tokens 1502, 1504, and 1506. Suggestion token 1506 is displayed on the right side of alternative display area 1530 in a rightmost cell location 1536 since its designated display location 1518 is on the right side of display area 1310 and/or is closest to the right side of display area 1310 among the designated display locations of colliding tokens 1502, 1504, and 1506. Suggestion token 1504 is displayed in the middle of alternative display area 1530 in a middle cell location 1534 since its designated display location 1512 is closest to the middle among the designated display locations of colliding tokens 1502, 1504, and 1506.

Any of the colliding suggestion tokens 1502, 1504, or 1506 can be selected by the user similarly to any of the cells in display area 1310, to cause the selected suggestion token to be appended to the end of content item 1402 in input field 1306.

Figure 16:
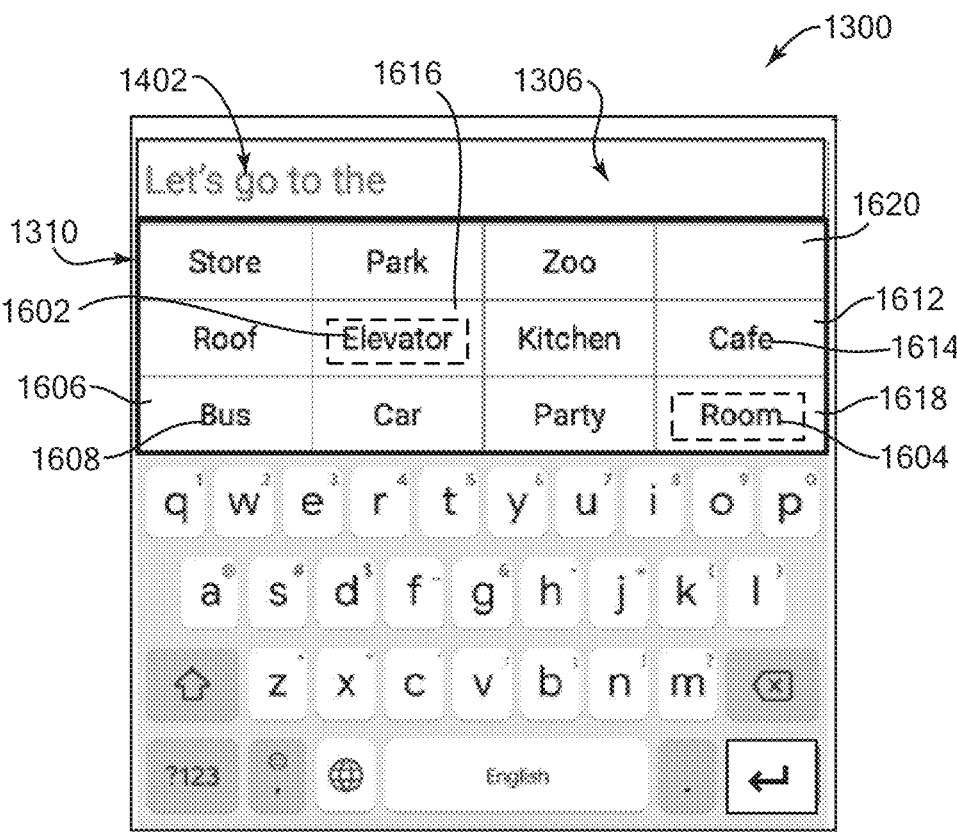

FIG. 16 is a diagrammatic illustration showing the example user interface 1300 of FIG. 13, in which the content item 1402 has been input by the user similarly as in FIG. 14 and in which colliding suggestion tokens are displayed in vacant display locations. In the example of FIG. 16, suggestion tokens have been generated for the content item 1402. However, two of the suggestion tokens 1602 and 1604 (indicated by dashed lines in FIG. 16, where the dashed lines are not actually displayed) have collided with other suggestion tokens that have the same designated display locations in the display area. For example, colliding suggestion token 1602 ("Elevator") has a designated cell location 1606, in which suggestion token 1608 ("Bus") is also designated to be displayed. Colliding suggestion token 1604 ("Room") has a designated cell location 1612, in which suggestion token 1614 ("Cafe") is also designated to be displayed. Colliding suggestion tokens 1602 and 1604 were determined to have lower priority than the respective colliding suggestion token displayed in their respective designated display location.

In addition, three vacant cell locations in display area 1310 have also been determined. These locations are cell locations 1616, 1618, and 1620. The device has determined that cell location 1616 qualifies to display the suggestion token 1602 because it is within the threshold distance of one cell (e.g., adjacent cells, including diagonally adjacent) to the designated display location 1606 of suggestion token 1602. The device has also determined that cell location 1618 qualifies to display the suggestion token 1604 because it is within the threshold distance of one cell to the designated display location 1612 of suggestion token 1604. Thus, the suggestion tokens 1602 and 1604 are displayed in cell locations 1616 and 1618, respectively. Cell location 1620 is determined to be a vacant location as well, but no other suggestion tokens have collided and so this location remains vacant as shown. In some cases, there may be additional colliding suggestion tokens, but a vacant location may not qualify to display a colliding suggestion token if the vacant location is not located within the threshold distance (e.g., one cell) of the designated cell location of the colliding suggestion tokens.

Figure 17:
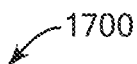
FIG. 17 is a block diagram of an example device which may be used for one or more implementations described herein.

FIG. 17 is a block diagram of an example device 1700 which may be used to implement one or more features described herein. In one example, device 1700 may be used to implement a client device, e.g., any of client devices 120-126 shown in FIG. 1. Alternatively, device 1700 can implement a server device, e.g., server device 104, etc. In some implementations, device 1700 may be used to implement a client device, a server device, or a combination of the above. Device 1700 can be any suitable computer system, server, or other electronic or hardware device as described above.

One or more methods described herein (e.g., 200, 300, 400 and/or 500) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1700 includes a processor 1702, a memory 1704, and I/O interface 1706. Processor 1702 can be one or more processors and/or processing circuits to execute program code and control basic operations of the device 1700. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 1702 may include one or more co-processors that implement neural-network processing. In some implementations, processor 1702 may be a processor that processes data to produce probabilistic output, e.g., the output produced by processor 1702 may be imprecise or may be accurate within a range from an expected output. For example, a processor may perform its functions in "real-time," "offline," in a "batch mode," etc. Portions of processing may be performed at different times and at different locations, by different (or the same) processing systems. A computer may be any processor in communication with a memory.

Memory 1704 is typically provided in device 1700 for access by the processor 1702, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 1702 and/or integrated therewith. Memory 1704 can store software operating on the server device 1700 by the processor 1702, including an operating system 1708, machine-learning application 1730, other applications 1712, and application data 1714. Other applications 1712 may include applications such as a virtual keyboard (software keyboard) application, a suggestion application, a data display engine, web hosting engine, image display engine, notification engine, social networking engine, etc. In some implementations, the machine-learning application 1730 and/or other applications 1712 can each include instructions that enable processor 1702 to perform functions described herein, e.g., some or all of the methods of FIGS. 2, 3, 4, and/or 5. Application data 1714 can include sets of content items, sets and groups of suggestion tokens, and data structures (e.g., tables, lists, graphs) used to determine suggestion tokens and their display locations as described herein.

The machine-learning application 1730 can include one or more named-entity recognition (NER) implementations for which supervised and/or unsupervised learning can be used. The machine learning models can include multi-task learning based models, residual task bidirectional LSTM (long short-term memory) with conditional random fields, statistical NER, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 1730 may utilize Bayesian classifiers, support vector machines, neural networks, or other learning techniques. In some implementations, machine-learning application 1730 may include trained models 1734, an inference engine 1736, and data 1732. In some implementations, data 1732 may include training data, e.g., data used to generate trained models 1734. For example, training data may include any type of data suitable for training a model for determining suggestion tokens for content items, such as a corpus of content items and suggestion tokens, previous selections of suggestion tokens by users (if user consent has been obtained), etc. Training data may be obtained from any source, e.g., a data repository specifically marked for training, data for which permission is provided for use as training data for machine-learning, etc. In implementations where one or more users permit use of their respective user data to train a machine-learning model, e.g., trained models 1734, training data may include such user data. In implementations where users permit use of their respective user data, data 1732 may include permitted data.

In some implementations, training data may include synthetic data generated for the purpose of training, such as data that is not based on user input or activity in the context that is being trained, e.g., data generated from simulations or models, etc. In some implementations, machine-learning application 1730 excludes data 1732. For example, in these implementations, the trained models 1734 may be generated, e.g., on a different device, and be provided as part of machine-learning application 1730. In various implementations, the trained models 1734 may be provided as a data file that includes a model structure or form, and associated weights. Inference engine 1736 may read the data file for trained model 1734 and implement a neural network with node connectivity, layers, and weights based on the model structure or form specified in trained models 1734.

Machine-learning application 1730 also includes one or more trained models 1734. For example, such models can include physics-specific trained models and a trained meta-model as described herein. In some implementations, the trained models 1734 may include one or more model forms or structures. For example, model forms or structures can include any type of neural-network, such as a linear net-work, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 1732 or application data 1714. Such data can include, for example, content items, sugges-tion tokens, and/or selections of suggestion tokens, e.g., when a trained model is used for determining suggestion tokens. Subsequent intermediate layers may receive as input output of nodes of a previous layer per the connectivity specified in the model form or structure. These layers may also be referred to as hidden layers. A final layer (e.g., output layer) produces an output of the machine-learning applica-tion. For example, the output may be a set of suggestion tokens to be provided for a content item. In some imple-mentations, model form or structure also specifies a number and/or type of nodes in each layer.

In different implementations, one or more trained models 1734 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some imple-mentations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, one or more trained models 1734 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1732, to produce a result.

For example, training may include applying supervised learning techniques. In supervised learning, the training data can include a plurality of inputs (e.g., content items) and a corresponding expected output for each input (e.g., a set of suggestion tokens for each content item). Based on a com-parison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to determine or cluster suggestion tokens for content items that are similar to each other.

In another example, a model trained using unsupervised learning may cluster words based on the use of the words in data sources. In some implementations, unsupervised learn-ing may be used to produce knowledge representations, e.g., that may be used by machine-learning application 1730. In various implementations, a trained model includes a set of weights, or embeddings, corresponding to the model struc-ture. In implementations where data 1732 is omitted, machine-learning application 1730 may include trained models 1734 that are based on prior training, e.g., by a developer of the machine-learning application 1730, by a third-party, etc. In some implementations, one or more of trained models 1734 may each include a set of weights that are fixed, e.g., downloaded from a server that provides the weights.

Machine-learning application 1730 also includes an infer-ence engine 1736. Inference engine 1736 is configured to apply the trained models 1734 to data, such as application data 1714, to provide inferences such as a set of suggestion tokens for a content item. In some implementations, infer-ence engine 1736 may include software code to be executed by processor 1702. In some implementations, inference engine 1736 may specify circuit configuration (e.g., for a programmable processor, for a field programmable gate array (FPGA), etc.) enabling processor 1702 to apply the trained model. In some implementations, inference engine 1736 may include software instructions, hardware instruc-tions, or a combination. In some implementations, inference engine 1736 may offer an application programming interface (API) that can be used by operating system 1708 and/or other applications 1712 to invoke inference engine 1736, e.g., to apply trained models 1734 to application data 1714 to generate an inference.

Machine-learning application 1730 may provide several technical advantages. For example, when trained models 1734 are generated based on unsupervised learning, trained models 1734 can be applied by inference engine 1736 to produce knowledge representations (e.g., numeric representations) from input data, e.g., application data 1714. For example, a model trained for determining suggestion tokens may produce representations of a set of suggestion tokens. In some implementations, such representations may be helpful to reduce processing cost (e.g., computational cost, memory usage, etc.) to generate an output (e.g., a label, a classification, an estimated characteristic, etc.). In some implementations, such representations may be provided as input to a different machine-learning application that produces output from the output of inference engine 1736.

In some implementations, knowledge representations generated by machine-learning application 1730 may be provided to a different device that conducts further processing, e.g., over a network. In such implementations, providing the knowledge representations rather than data may provide a technical benefit, e.g., enable faster data transmission with reduced cost.

In some implementations, machine-learning application 1730 may be implemented in an offline manner. In these implementations, trained models 1734 may be generated in a first stage, and provided as part of machine-learning application 1730. In some implementations, machine-learning application 1730 may be implemented in an online manner. For example, in such implementations, an application that invokes machine-learning application 1730 (e.g., operating system 1708, one or more of other applications 1712) may utilize an inference produced by machine-learning application 1730, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained models 1734, e.g., to update embeddings for trained models 1734.

In some implementations, machine-learning application 1730 may be implemented in a manner that can adapt to particular configuration of device 1700 on which the machine-learning application 1730 is executed. For example, machine-learning application 1730 may determine a computational graph that utilizes available computational resources, e.g., processor 1702. For example, if machine-learning application 1730 is implemented as a distributed application on multiple devices, machine-learning application 1730 may determine computations to be carried out on individual devices in a manner that optimizes computation. In another example, machine-learning application 1730 may determine that processor 1702 includes a GPU with a particular number of GPU cores (e.g., 1000) and implement the inference engine accordingly (e.g., as 1000 individual processes or threads).

In some implementations, machine-learning application 1730 may implement an ensemble of trained models. For example, trained models 1734 may include a plurality of trained models that are each applicable to same input data. In these implementations, machine-learning application 1730 may choose a particular trained model, e.g., based on available computational resources, success rate with prior inferences, etc. In some implementations, machine-learning application 1730 may execute inference engine 1736 such that a plurality of trained models is applied. In these implementations, machine-learning application 1730 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1708 or one or more other applications 1712.

In different implementations, machine-learning application 1730 can produce different types of outputs. In some implementations, machine-learning application 1730 may produce an output based on a format specified by an invoking application, e.g., operating system 1708 or one or more other applications 1712. In some implementations, an invoking application may be another machine-learning application. For example, such configurations may be used in generative adversarial networks, where an invoking machine-learning application is trained using output from machine-learning application 1730 and vice-versa.

Any of software in memory 1704 can alternatively be stored on any other suitable storage location or computer-readable medium. In addition, memory 1704 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 1704 and any other type of storage (magnetic disk, optical disk, magnetic tape, or other tangible media) can be considered "storage" or "storage devices."

I/O interface 1706 can provide functions to enable interfacing the server device 1700 with other systems and devices. Interfaced devices can be included as part of the device 1700 or can be separate and communicate with the device 1700. For example, network communication devices, storage devices (e.g., memory 1704 and/or database 106), and input/output devices can communicate via I/O interface 1706. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 1706 can include one or more display devices 1720 and one or more data stores 1738 (as discussed above). The display devices 1720 that can be used to display content, e.g., a user interface of an output application as described herein. Display device 1720 can be connected to device 1700 via local connections (e.g., display bus) and/or via networked connections and can be any suitable display device. Display device 1720 can include any suitable display device such as an LCD, LED, or plasma display screen, CRT, television, monitor, touchscreen, 3-D display screen, or other visual display device. For example, display device 1720 can be a flat display screen provided on a mobile device, multiple display screens provided in a goggles or headset device, a projector, or a monitor screen for a computer device.

The I/O interface 1706 can interface to other input and output devices. Some examples include display devices, printer devices, scanner devices, etc. Some implementations can provide a microphone for capturing sound, voice commands, etc., audio speaker devices for outputting sound, or other input and output devices.

For ease of illustration, FIG. 17 shows one block for each of processor 1702, memory 1704, I/O interface 1706, and software blocks 1708, 1712, and 1730. These blocks may represent one or more processors or processing circuitries, operating systems, memories, I/O interfaces, applications, and/or software modules. In other implementations, device 1700 may not have all of the components shown and/or may have other elements including other types of elements instead of, or in addition to, those shown herein. While some components are described as performing blocks and operations as described in some implementations herein, any suitable component or combination of components of environment 100, device 1700, similar systems, or any suitable processor or processors associated with such a system, may perform the blocks and operations described.

In some implementations, the prediction model can be handcrafted including hand selected functional labels and thresholds. In some implementations, a mapping (or calibration) from analysis space to a predicted precision within a result space can be performed using a piecewise linear model.

Although the description has been described with respect to particular implementations, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's or user device's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   obtaining a content item based at least in part on user input;
   determining a plurality of suggestion tokens based on the content item, wherein each suggestion token indicates a different modification to the content item;

determining, for each of the plurality of suggestion tokens, a respective display location of a plurality of spatially-arranged display locations in a user interface, wherein each suggestion token of the plurality of suggestion tokens is previously associated with the respective display location where the suggestion token is to be displayed in the user interface;
   determining whether two or more suggestion tokens of the plurality of suggestion tokens conflict by being associated with a same display location in the user interface;
   in response to determining that the two or more suggestion tokens conflict by being associated with the same display location, assigning a respective priority level to each of the two or more suggestion tokens based on a probability of user selection of each of the two or more suggestion tokens;
   selecting a first suggestion token from the two or more suggestion tokens based on the assigned priority levels, wherein the first suggestion token has a higher priority level than other tokens of the two or more suggestion tokens; and
   causing the user interface to be displayed by a device, wherein the user interface includes one or more suggestion tokens of the plurality of suggestion tokens displayed in the respective display locations associated with the one or more suggestion tokens, wherein the user interface includes the first suggestion token displayed in the same display location, wherein the one or more suggestion tokens are selectable by a user to modify the content item.

2. The computer-implemented method of claim 1, wherein the content item includes one or more words forming a prefix that is part of a text phrase, wherein determining the plurality of suggestion tokens includes determining a plurality of suggestion words to follow the prefix in the text phrase, and wherein the one or more suggestion tokens are one or more suggestion words, wherein determining the plurality of suggestion words includes determining the plurality of suggestion words as most probable words to follow the prefix, and further comprising:
   receiving a selection of a particular suggestion word of the one or more suggestion words; and
   in response to receiving the selection, adding the particular suggestion word to the content item following the prefix.

3. The computer-implemented method of claim 1, wherein the content item includes one or more graphical characters that are associated with or represent the content item, wherein the one or more suggestion tokens are one or more suggestion graphical characters, and further comprising:
   receiving a selection of a particular suggestion graphical character of the one or more suggestion graphical characters; and
   in response to receiving the selection of the particular suggestion graphical character, replacing at least a portion of the content item with the particular suggestion graphical character or adding the particular suggestion graphical character to the content item.

4. The computer-implemented method of claim 1, wherein assigning a respective priority level to each of the two or more suggestion tokens includes determining the respective priority level based on the probability of user selection of the respective suggestion token and based on at least one of the group comprising: a recency that the suggestion token has been selected by the user, a recency that the suggestion token has been displayed in the respective display location, the length or a size of the suggestion token, or combinations thereof.

5. The computer-implemented method of claim 1, wherein the content item includes context information, wherein the context information includes at least one of: one or more previous communications sent or received by the device, audio captured by the device, video captured by the device, and a geographic location of the device.

6. The computer-implemented method of claim 1, wherein determining the one or more suggestion tokens includes removing at least one suggestion token from the plurality of suggestion tokens to cause the one or more suggestion tokens to be displayed without conflict for the respective display locations.

7. The computer-implemented method of claim 1, wherein determining, for each of the plurality of suggestion tokens, a respective display location is based on a stored suggestion map that indicates the associated respective display locations for the suggestion tokens without conflict for the respective display locations.

8. The computer-implemented method of claim 7, wherein the stored suggestion map is based on a graph that includes nodes that correspond to the plurality of suggestion tokens, wherein each pair of the plurality of suggestion tokens is connected in the graph by an edge if the suggestion tokens of the pair both occur as suggestion tokens for a particular content item, wherein each node in the graph is assigned a class by a vertex coloring technique such that two nodes that share an edge have different classes, and wherein each class corresponds to a different display location of the respective display locations.

9. The computer-implemented method of claim 8 further comprising:

generating the graph prior to receiving the user input; and
removing at least one of: one or more nodes or one or more edges of the graph to enable the plurality of suggestion tokens to be displayed in the associated display locations with reduced conflict for the associated display locations.

10. The computer-implemented method of claim 9 wherein generating the graph includes determining the nodes and edges by processing a corpus of text including content items and suggestion tokens associated with the content items.

11. The computer-implemented method of claim 1, wherein a second suggestion token of the two or more suggestion tokens has a lower probability of selection than the first suggestion token and is excluded from the user interface.

12. The computer-implemented method of claim 1, further comprising:

causing a second suggestion token of the two or more suggestion tokens to be displayed in a different display location of the user interface than the same display location associated with the first suggestion token.

13. The computer-implemented method of claim 12, wherein the different display location is a display location within a threshold distance of the same display location associated with the first suggestion token.

14. The computer-implemented method of claim 12, wherein the respective display locations are located in a first display area of the user interface, and wherein the different display location is located in a second display area separate from the first display area.

15. A system to provide user content modification suggestions, the system comprising:

a memory storing instructions; and
at least one processor coupled to the memory, the at least one processor configured to access the instructions from the memory to perform operations comprising:
obtaining a content item based at least in part on user input;
determining a plurality of suggestion tokens based on the content item, wherein each suggestion token indicates a different modification to the content item;
determining, for each of the plurality of suggestion tokens, a respective display location of a plurality of spatially-arranged display locations in a user interface, wherein each suggestion token of the plurality of suggestion tokens is previously associated with the respective display location where the suggestion token is to be displayed in the user interface;
determining whether two or more suggestion tokens of the plurality of suggestion tokens conflict by being associated with a same display location in the user interface;
in response to determining that the two or more suggestion tokens conflict by being associated with the same display location, assigning a respective priority level to each of the two or more suggestion tokens based on a probability of user selection of each of the two or more suggestion tokens;
selecting a first suggestion token from the two or more suggestion tokens based on the assigned priority levels, wherein the first suggestion token has a higher priority level than other tokens of the two or more suggestion tokens; and
causing the user interface to be displayed by a device, wherein the user interface includes one or more suggestion tokens of the plurality of suggestion tokens displayed in the respective display locations associated with the one or more suggestion tokens, wherein the user interface includes the first suggestion token displayed in the same display location, wherein the one or more suggestion tokens are selectable by a user to modify the content item.

16. The system of claim 15, wherein the operations further comprise:

causing a second suggestion token of the two or more suggestion tokens to be displayed in a different display location of the user interface that is different than the respective display location associated with the first suggestion token,
wherein the different display location is a display location within a threshold distance of the same display location associated with the first suggestion token.

17. A non-transitory computer readable medium having stored thereon software instructions that, when executed by a processor, cause the processor to perform operations comprising:

obtaining a content item based at least in part on user input;
determining a plurality of suggestion tokens based on the content item, wherein each suggestion token indicates a different modification to the content item;
determining, for each of the plurality of suggestion tokens, a respective display location of a plurality of spatially-arranged display locations in a user interface, wherein each suggestion token of the plurality of suggestion tokens is previously associated with the respective display location where the suggestion token is to be displayed in the user interface, wherein:

determining the respective display location is based on a stored suggestion map that indicates the associated respective display locations for the suggestion tokens without conflict for the respective display locations, the stored suggestion map is based on a graph that includes nodes that correspond to the plurality of suggestion tokens, and respective individual pairs of the plurality of suggestion tokens are connected in the graph by a respective edge if the suggestion tokens of the respective individual pairs both occur as suggestion tokens for a respective particular content item; and causing the user interface to be displayed by a device, wherein the user interface includes one or more suggestion tokens of the plurality of suggestion tokens displayed in the respective display locations associated with the one or more suggestion tokens, wherein the one or more suggestion tokens are selectable by a user to modify the content item.

18. The system of claim 15, wherein the operation of assigning a respective priority level to each of the two or more suggestion tokens includes determining the respective priority level based on the probability of user selection of the respective suggestion token and based on at least one of the group comprising: a recency that the suggestion token has been selected by the user, a recency that the suggestion token has been displayed in the respective display location, the length or a size of the suggestion token, or combinations thereof.

19. The system of claim 15, wherein:

determining the respective display location is based on a stored suggestion map that indicates the associated respective display locations for the suggestion tokens without conflict for the respective display locations, the stored suggestion map is based on a graph that includes nodes that correspond to the plurality of suggestion tokens, and respective individual pairs of the plurality of suggestion tokens are connected in the graph by a respective edge if the suggestion tokens of the respective individual pair both occur as suggestion tokens for a respective particular content item.

20. The non-transitory computer readable medium of claim 17, wherein the operations further comprise:

generating the graph prior to receiving the user input; and removing at least one of: one or more nodes or one or more edges of the graph to enable the plurality of suggestion tokens to be displayed in the associated display locations with reduced conflict for the associated display locations.

\* \* \* \* \*